(12) United States Patent
Amano

(10) Patent No.: US 8,967,812 B2
(45) Date of Patent: *Mar. 3, 2015

(54) PROJECTION OPTICAL SYSTEM AND PROJECTION DISPLAY APPARATUS

(71) Applicant: FUJIFILM Corporation, Tokyo (JP)

(72) Inventor: Masaru Amano, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 124 days.

This patent is subject to a terminal disclaimer.

(21) Appl. No.: 14/035,994

(22) Filed: Sep. 25, 2013

(65) Prior Publication Data

US 2014/0022519 A1    Jan. 23, 2014

Related U.S. Application Data

(63) Continuation of application No. PCT/JP2012/001849, filed on Mar. 16, 2012.

(30) Foreign Application Priority Data

Mar. 28, 2011   (JP) ................................ 2011-069284

(51) Int. Cl.
*G03B 21/14* (2006.01)
*G02B 13/18* (2006.01)
(Continued)

(52) U.S. Cl.
CPC .............. *G03B 21/142* (2013.01); *G02B 13/18* (2013.01); *G02B 27/0025* (2013.01); *G03B 21/28* (2013.01); *G02B 17/08* (2013.01)
USPC ................... 353/38; 353/30; 353/37; 353/94; 353/99; 353/101; 359/659; 359/689; 359/726

(58) Field of Classification Search
USPC ............. 353/30, 37, 38, 94, 98–99, 101, 102; 359/689, 651, 726, 733, 785; 348/742–747, 756, E5.137, E9.026; 349/5, 7–9
See application file for complete search history.

(56) References Cited

U.S. PATENT DOCUMENTS 6,752,500 B1 * 6/2004 Yoshii et al. .................... 353/78
7,791,819 B2 * 9/2010 Eguchi .......................... 359/689
(Continued)

FOREIGN PATENT DOCUMENTS

JP       2006-195433       7/2006
JP       2006-243019       9/2006
(Continued)

OTHER PUBLICATIONS

International Search Report, PCT/JP2012/001849, Jul. 3, 2012.

*Primary Examiner* — Sultan Chowdhury
(74) *Attorney, Agent, or Firm* — Young & Thompson

(57) ABSTRACT

A projection optical system substantially consists of a first optical system composed of a plurality of lenses and a second optical system composed of one reflection mirror having a convex aspherical surface arranged in this order from the reduction side and is configured, when an air space between the first optical system and the second optical system is taken as T12 and a displacement in a direction of the optical axial from a position of maximum effective height on the magnification side lens surface of the lens disposed on the most magnification side in the first optical system to the vertex of the lens surface is taken as Zf, to satisfy a conditional expression (1): 0.1<Zf/T12<1.0, in which an image formed on a conjugate plane on the reduction side is magnified and projected onto a conjugate plane on the magnification side.

16 Claims, 21 Drawing Sheets

EXAMPLE 9

(51) Int. Cl.
*G02B 27/00* (2006.01)
*G03B 21/28* (2006.01)
*G02B 17/08* (2006.01)

(56) References Cited

U.S. PATENT DOCUMENTS

| | | | |
|---|---|---|---|
| 7,922,339 B2* | 4/2011 | Sokolov et al. | 353/98 |
| 7,957,078 B2* | 6/2011 | Minefuji | 359/731 |
| 2001/0050758 A1* | 12/2001 | Suzuki et al. | 353/69 |
| 2002/0030791 A1* | 3/2002 | Ogawa | 353/30 |
| 2005/0041220 A1* | 2/2005 | Sunaga | 353/99 |
| 2006/0050408 A1* | 3/2006 | Hakko et al. | 359/692 |
| 2006/0132723 A1 | 6/2006 | Yamagishi | |

FOREIGN PATENT DOCUMENTS

| | | |
|---|---|---|
| JP | 2007-017707 | 1/2007 |
| JP | 2008-096761 | 4/2008 |
| JP | 2008-209831 | 9/2008 |
| JP | 2009-271372 | 11/2009 |
| JP | 2010-204328 | 9/2010 |

* cited by examiner

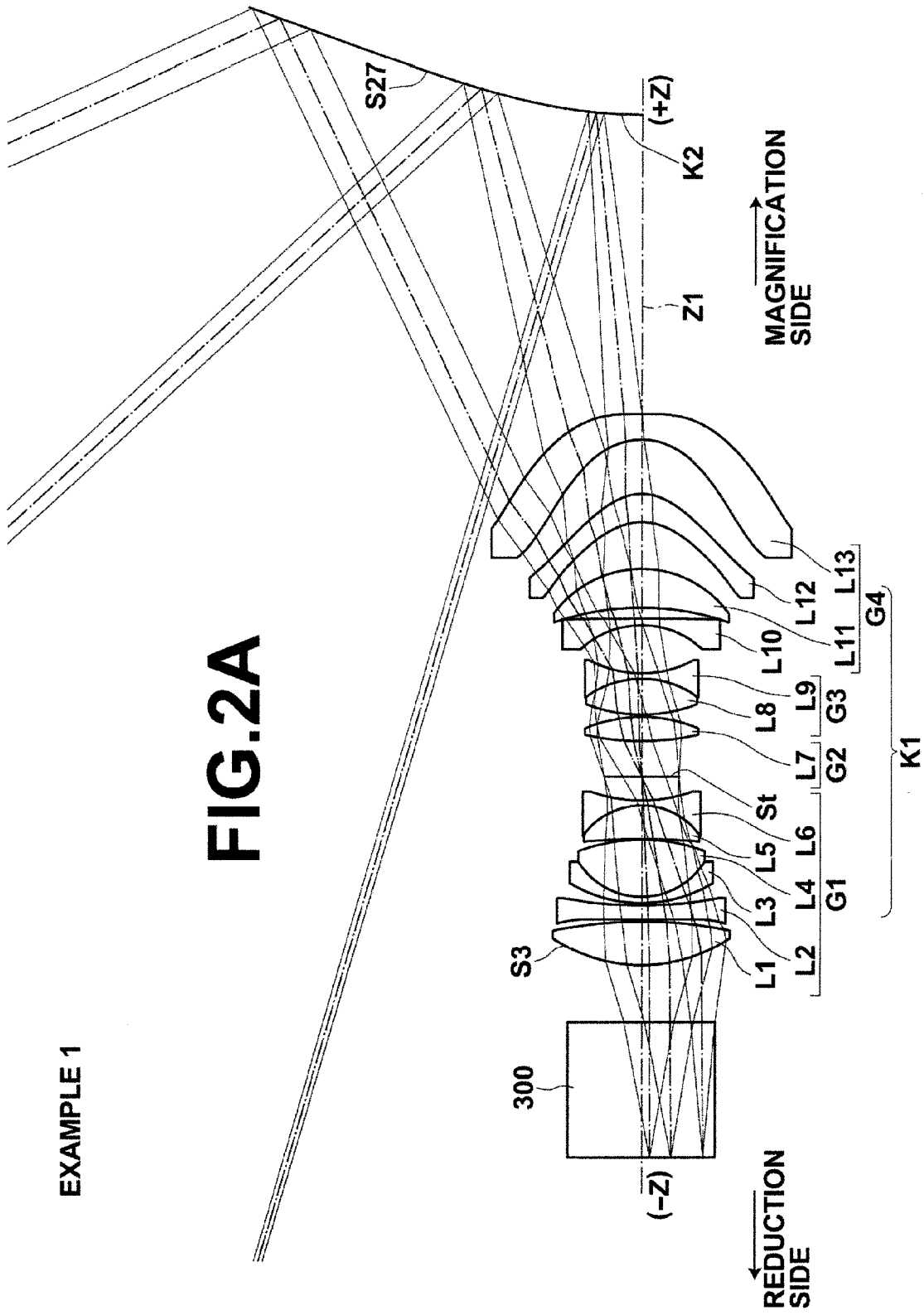

FIG.2B
EXAMPLE 1    DISTORTION
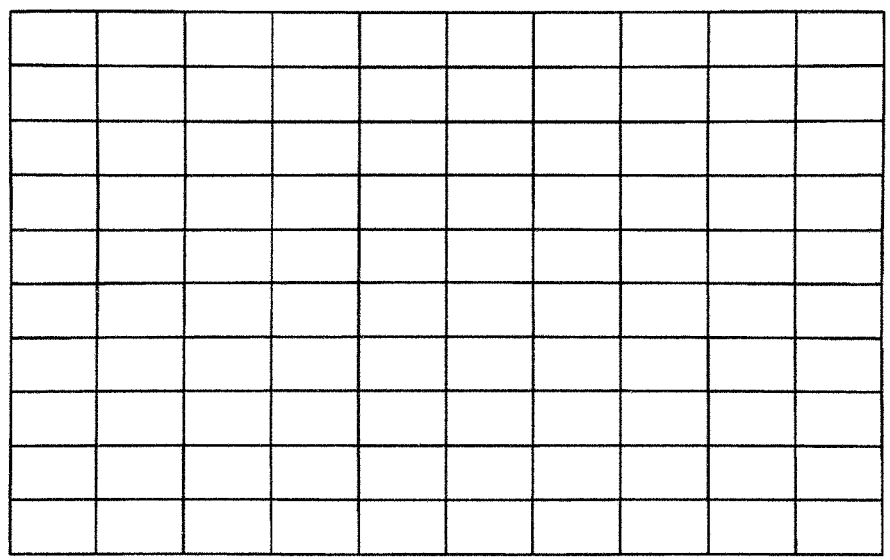
FIG.2C
EXAMPLE 1    SPOT DIAGRAMS (SIZE: 5 mm/SQUARE)
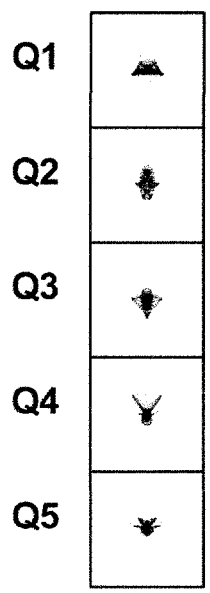
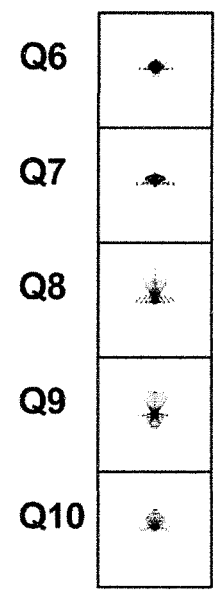
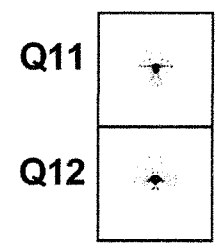

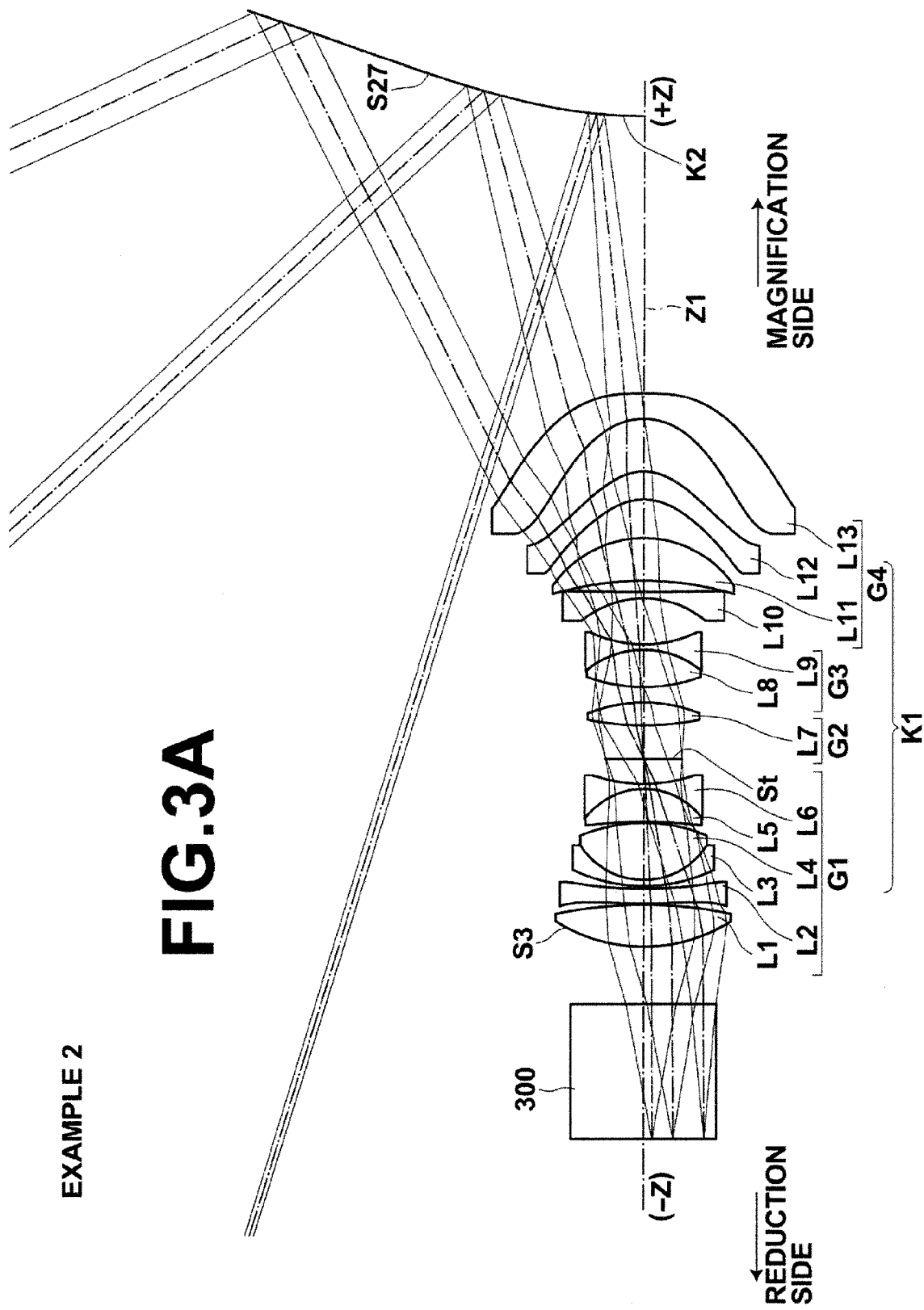

EXAMPLE 2    DISTORTION

EXAMPLE 2    SPOT DIAGRAMS (SIZE: 5 mm/SQUARE)

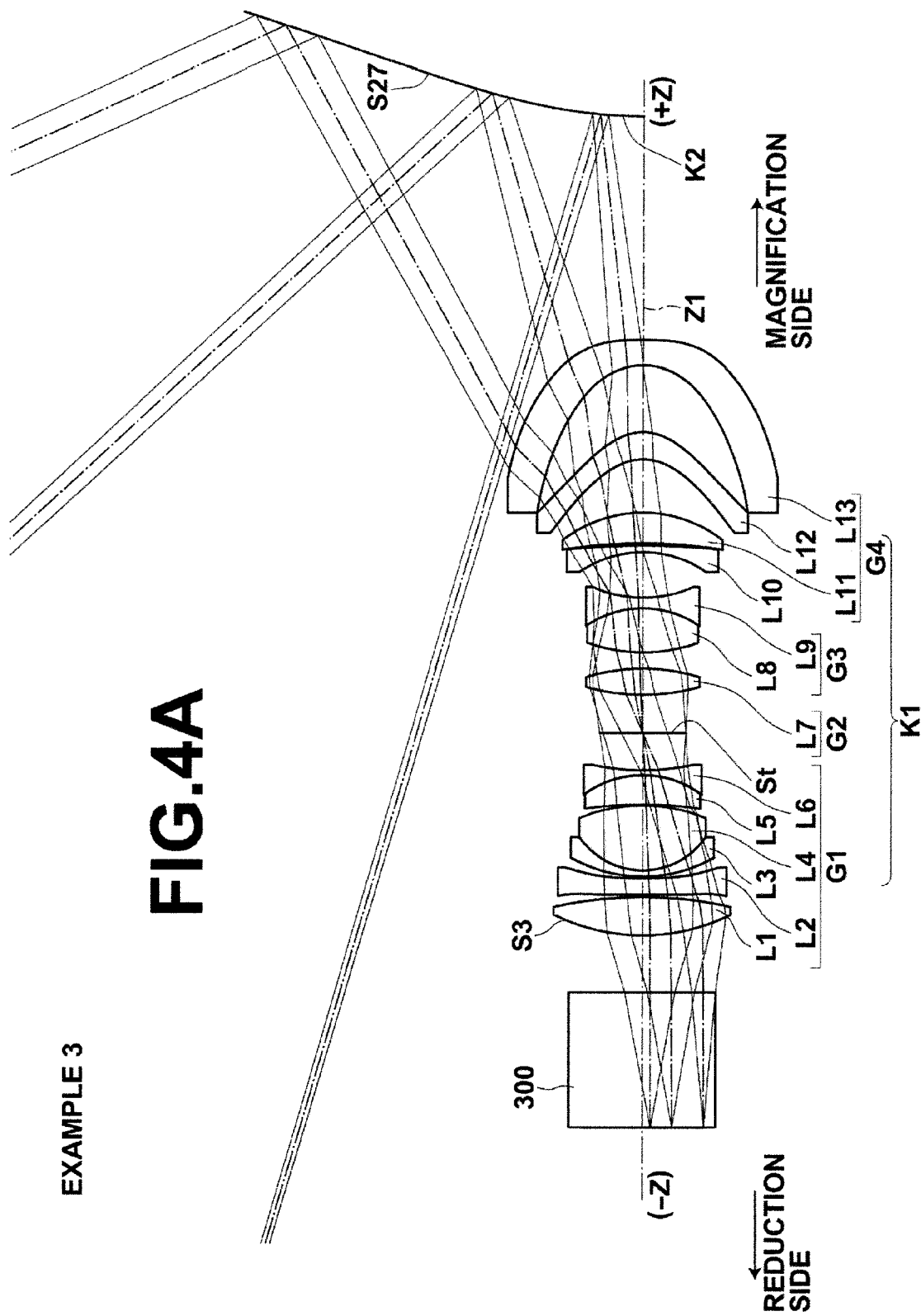

FIG.4B
EXAMPLE 3    DISTORTION
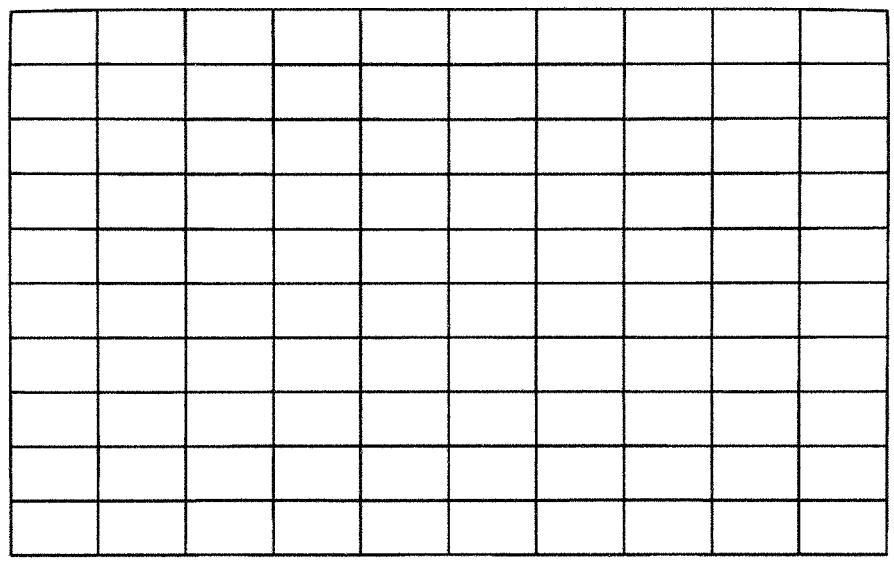
FIG.4C
EXAMPLE 3    SPOT DIAGRAMS (SIZE: 5 mm/SQUARE)
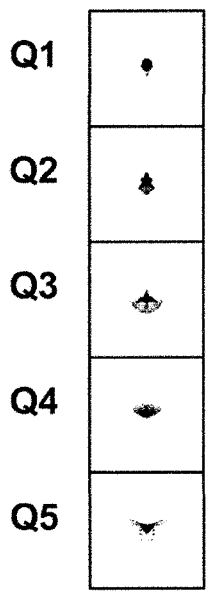 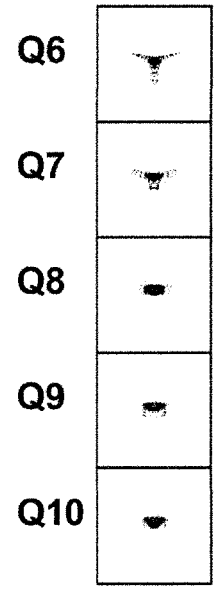 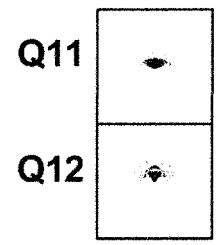

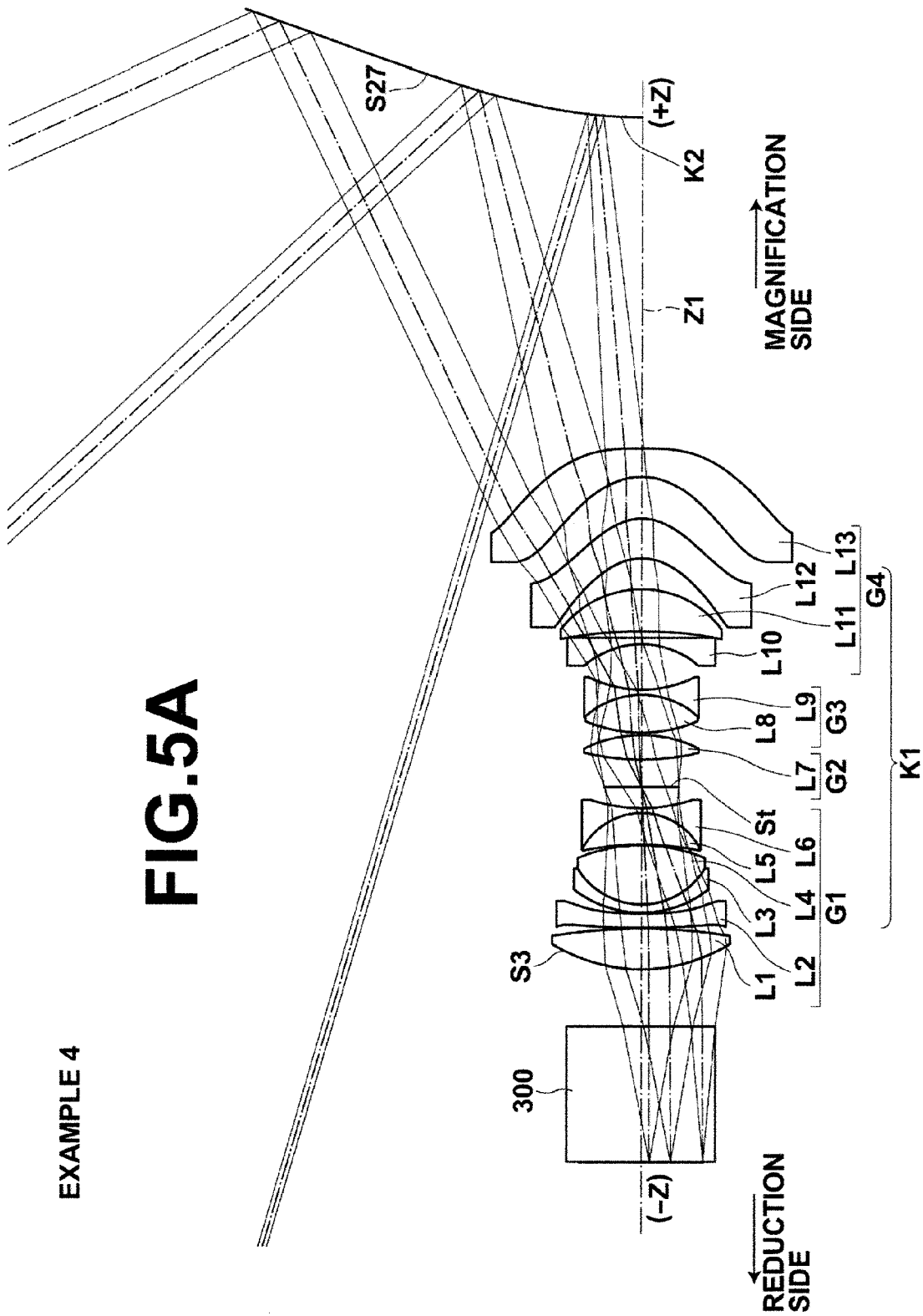

FIG.5B
EXAMPLE 4    DISTORTION
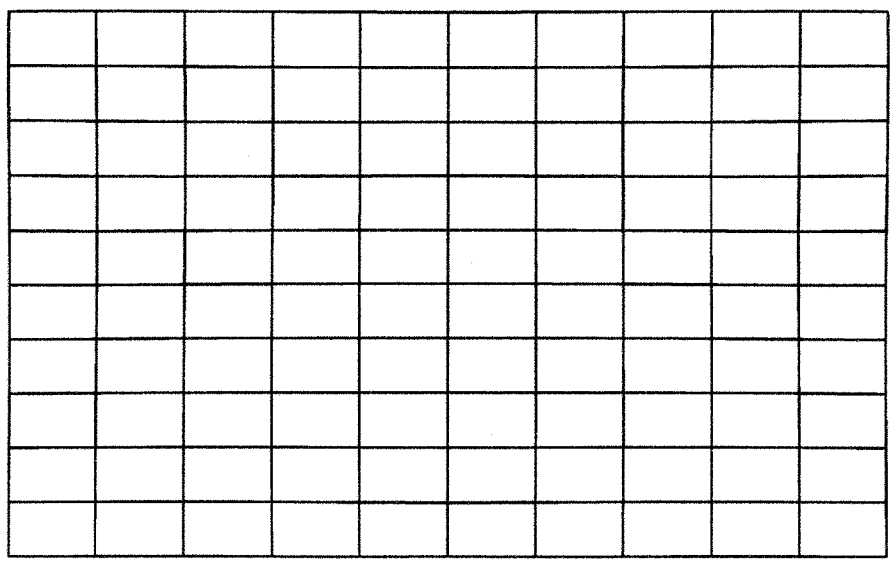
FIG.5C
EXAMPLE 4    SPOT DIAGRAMS (SIZE: 5 mm/SQUARE)
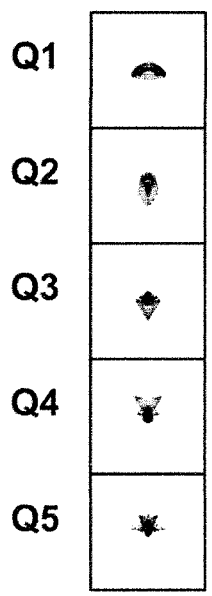 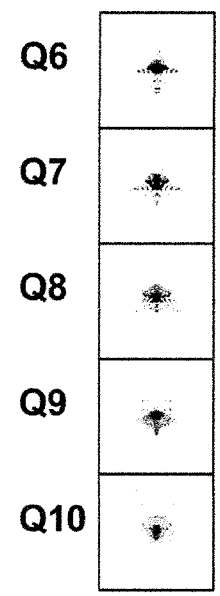 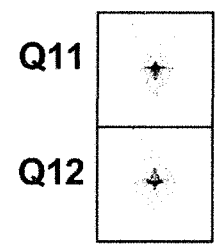

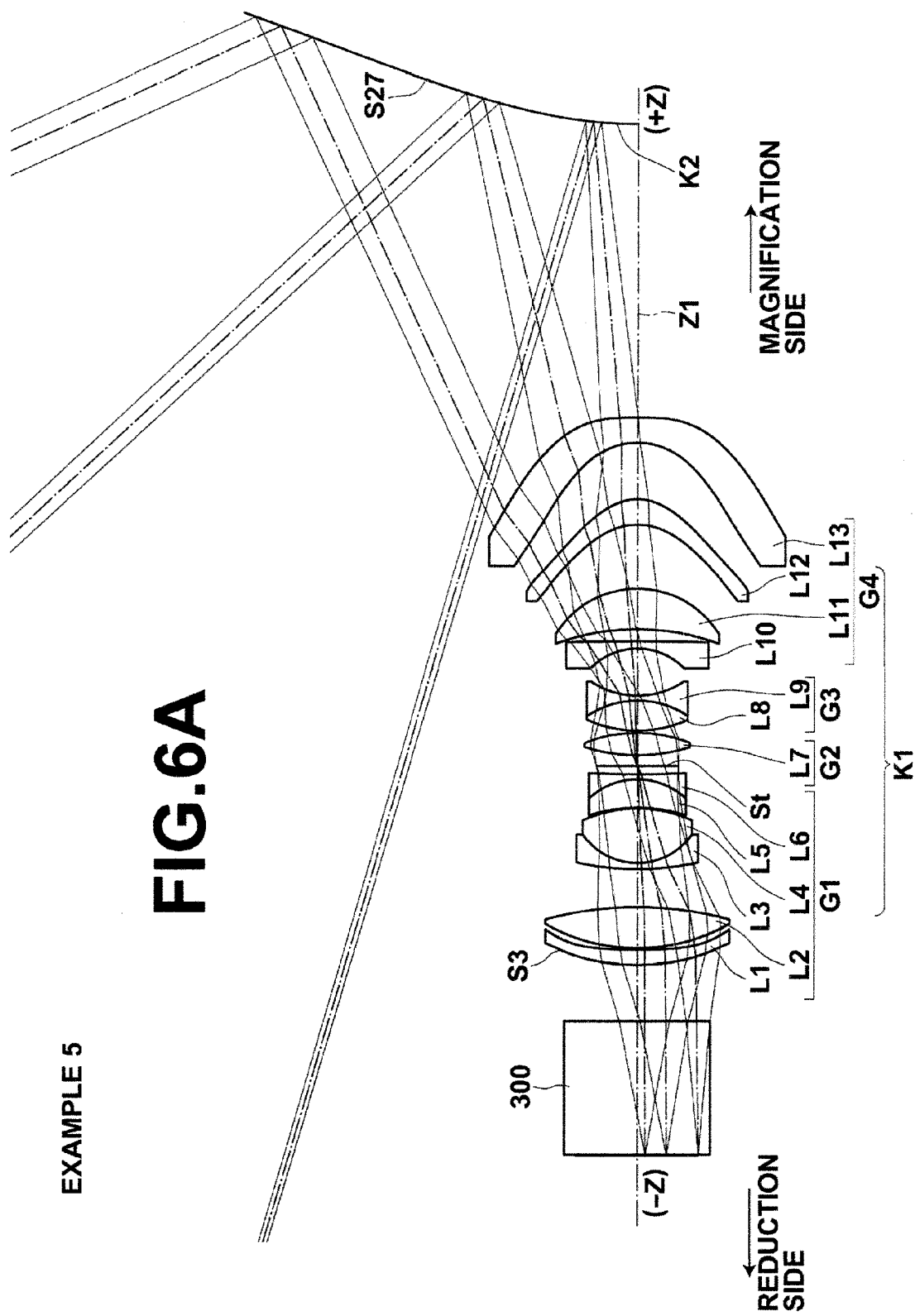

FIG.6B
EXAMPLE 5      DISTORTION
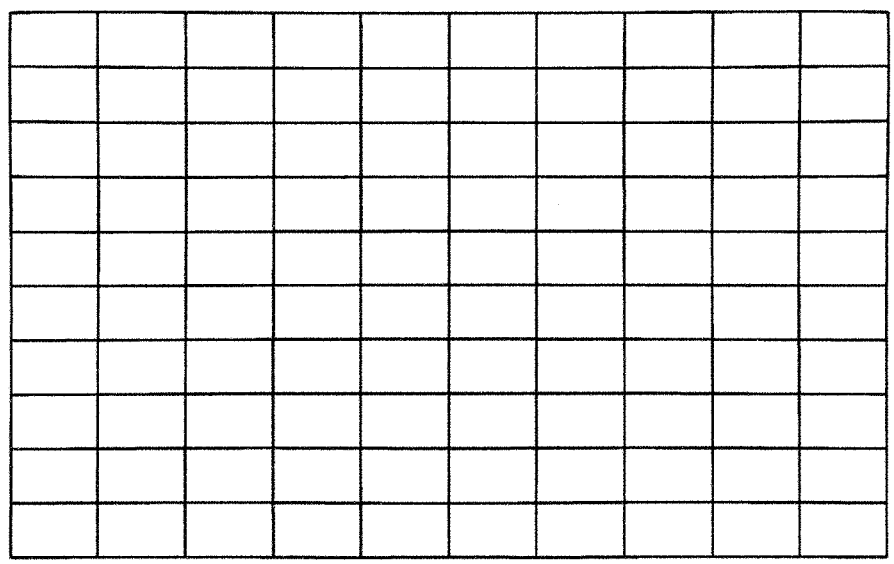
FIG.6C
EXAMPLE 5      SPOT DIAGRAMS (SIZE: 5 mm/SQUARE)
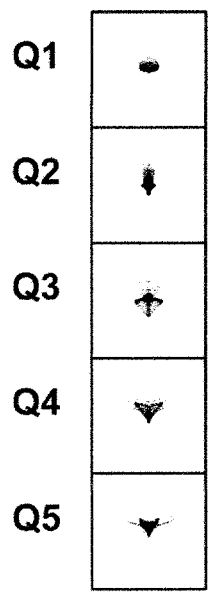
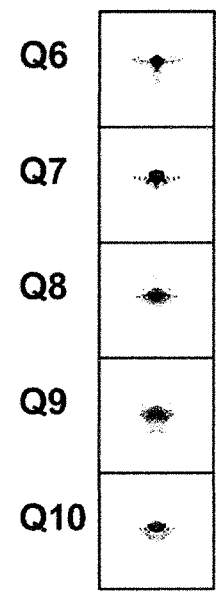
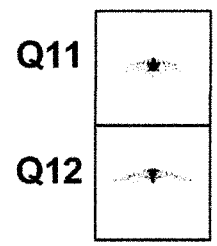

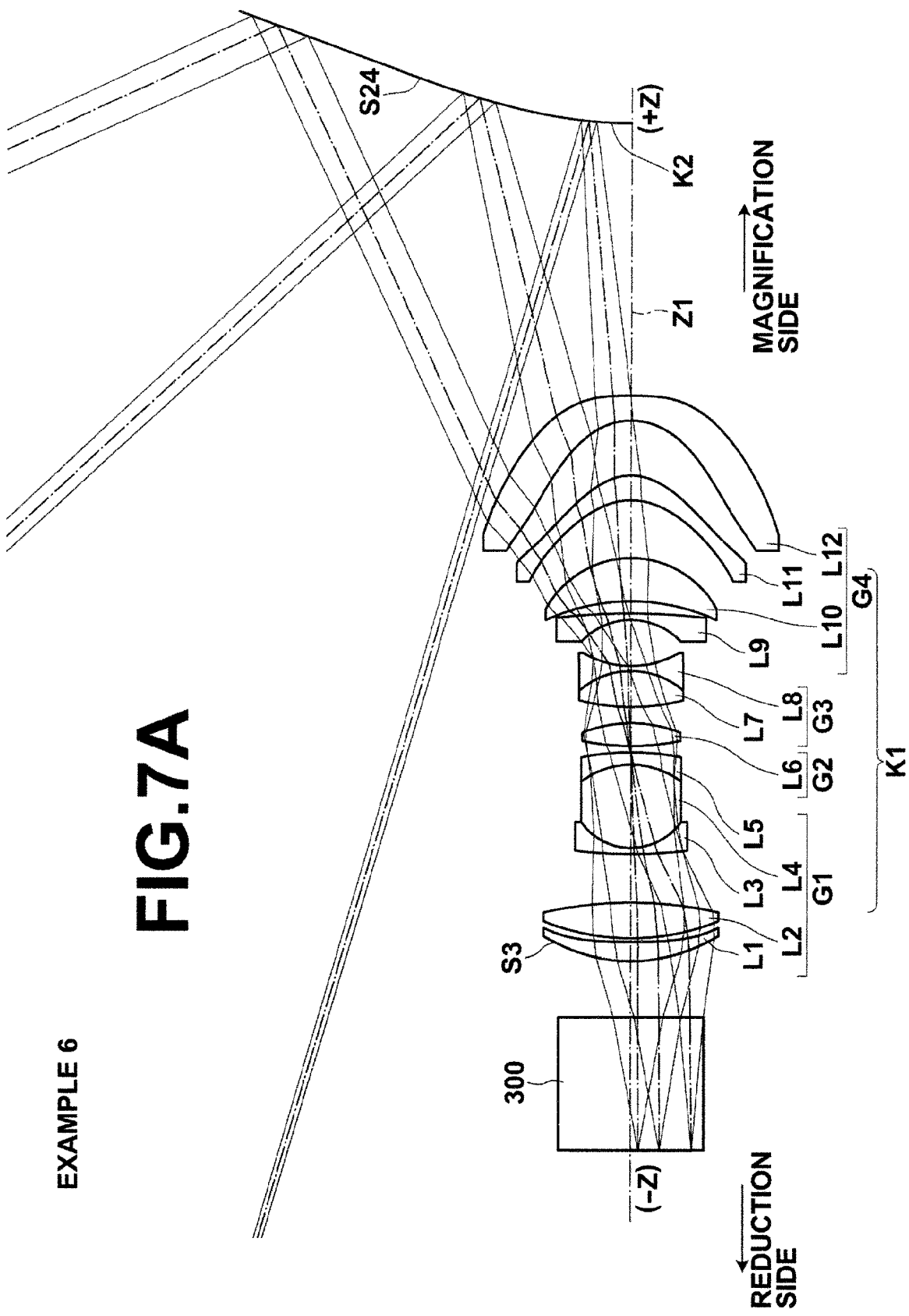

FIG.7B
EXAMPLE 6   DISTORTION
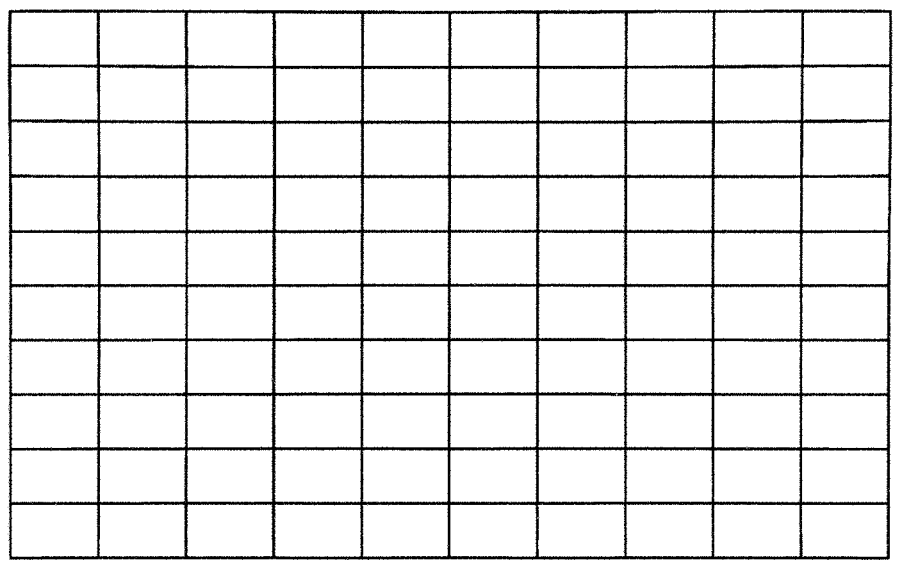
FIG.7C
EXAMPLE 6   SPOT DIAGRAMS (SIZE: 5 mm/SQUARE)
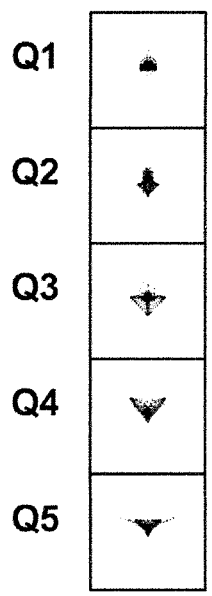
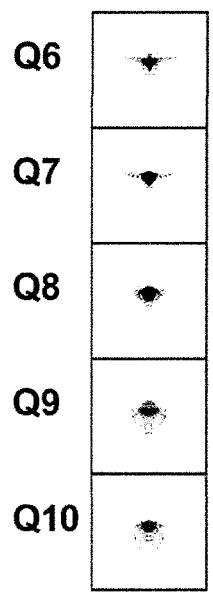
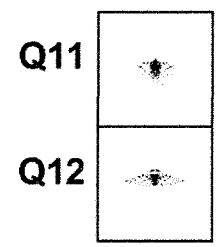

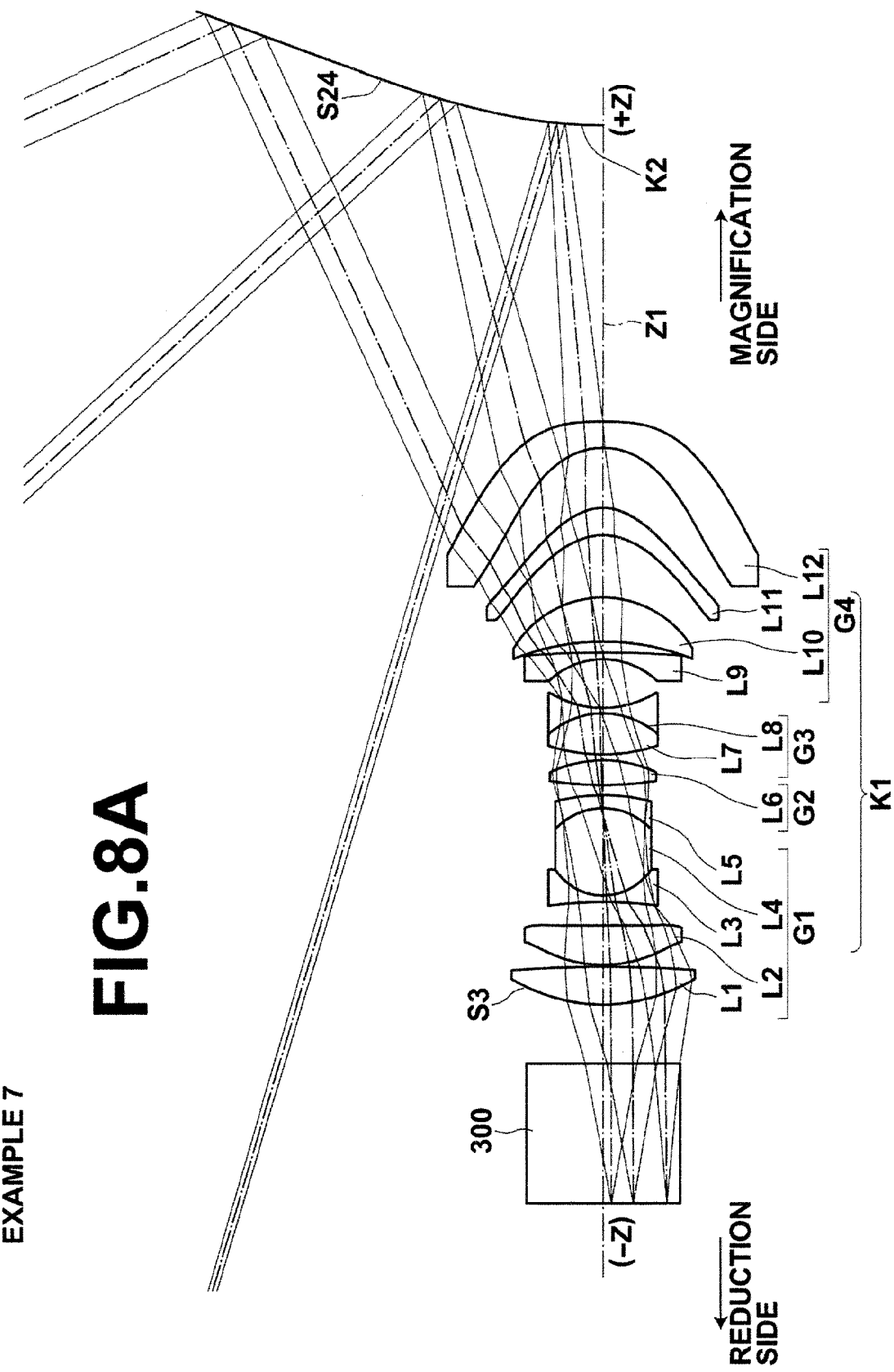

FIG.8B
EXAMPLE 7    DISTORTION
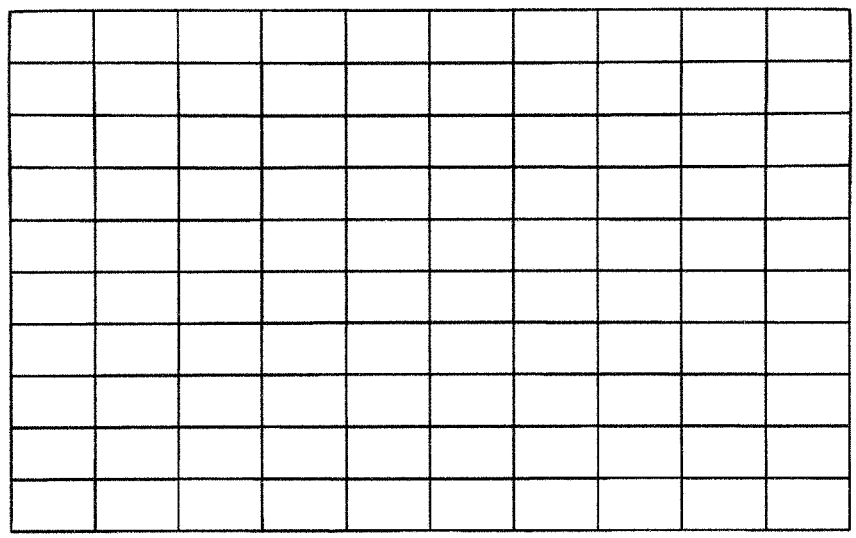
FIG.8C
EXAMPLE 7    SPOT DIAGRAMS (SIZE: 5 mm/SQUARE)
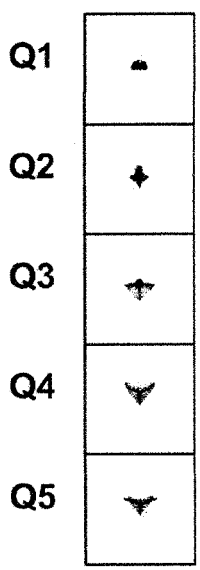
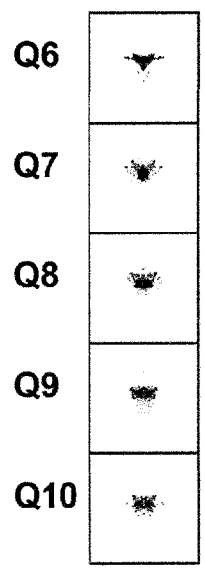
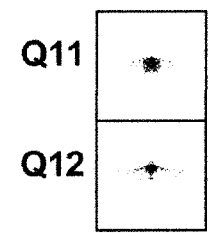

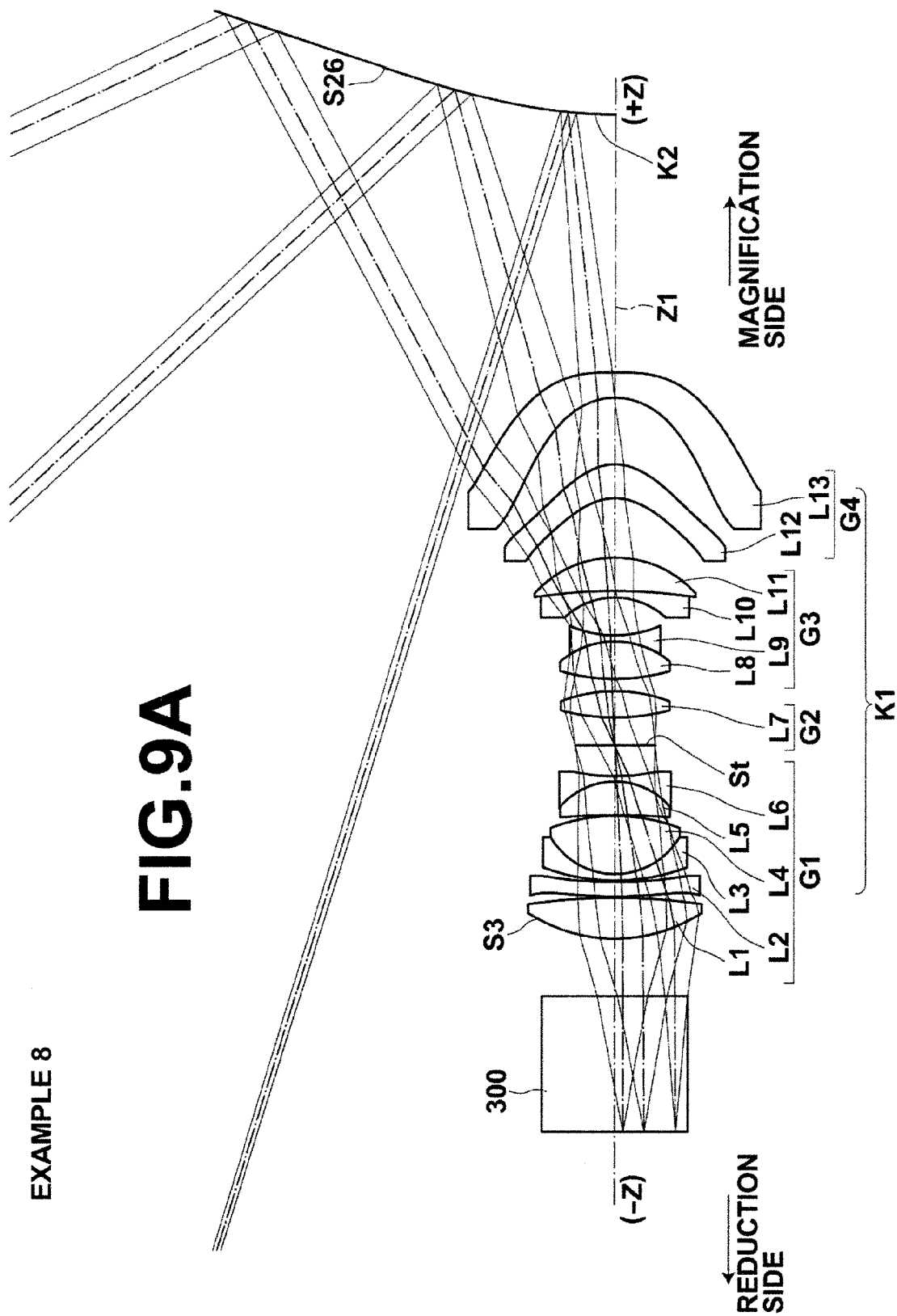

EXAMPLE 8  DISTORTION

EXAMPLE 8  SPOT DIAGRAMS (SIZE: 5 mm/SQUARE)

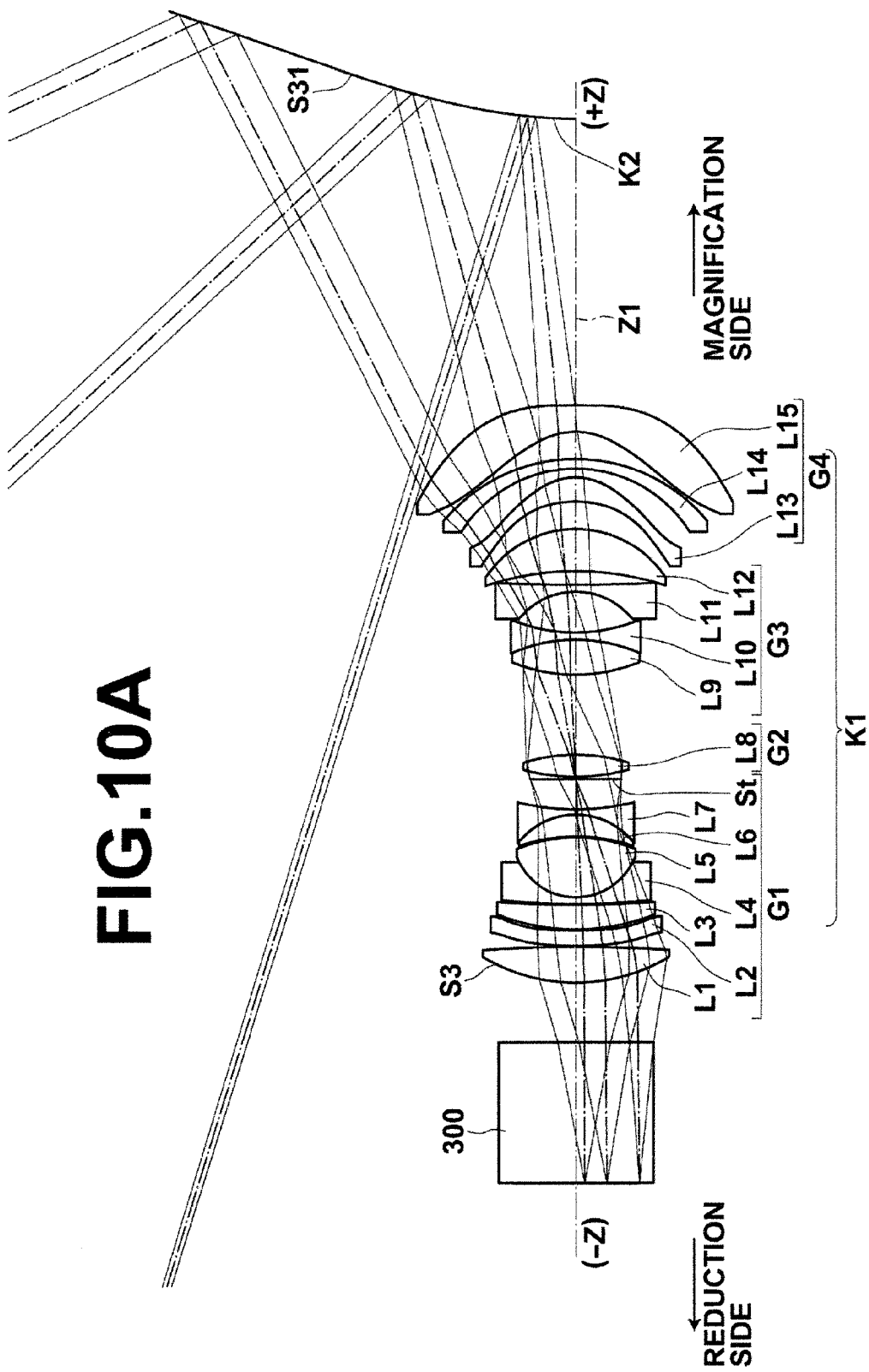

FIG.10B
EXAMPLE 9    DISTORTION
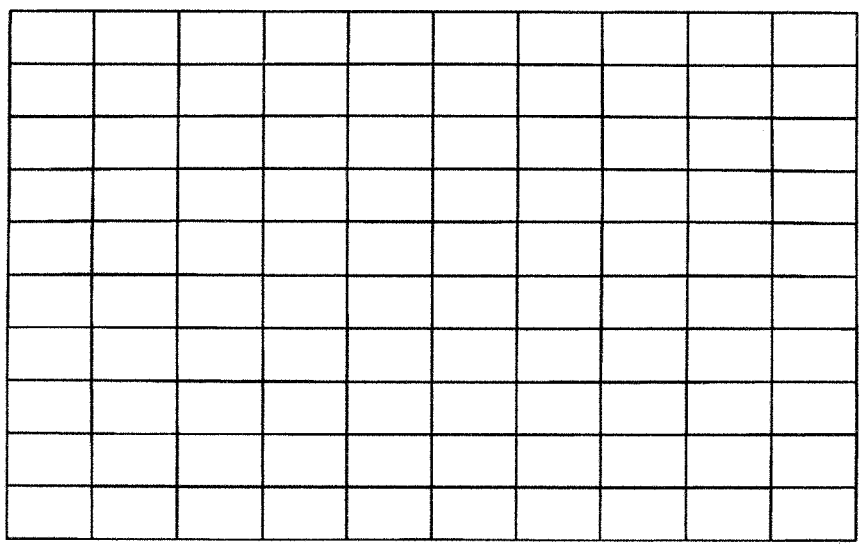
FIG.10C
EXAMPLE 9    SPOT DIAGRAMS (SIZE: 5 mm/SQUARE)
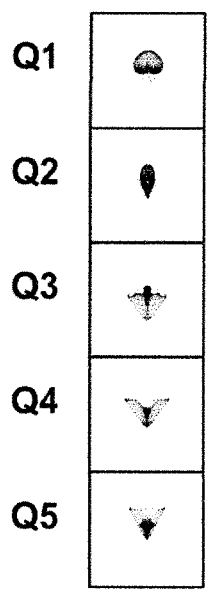
Q1
Q2
Q3
Q4
Q5
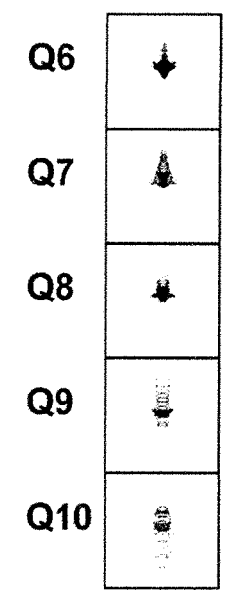
Q6
Q7
Q8
Q9
Q10
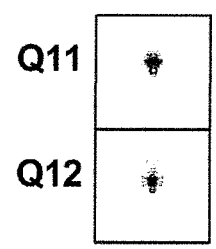
Q11
Q12

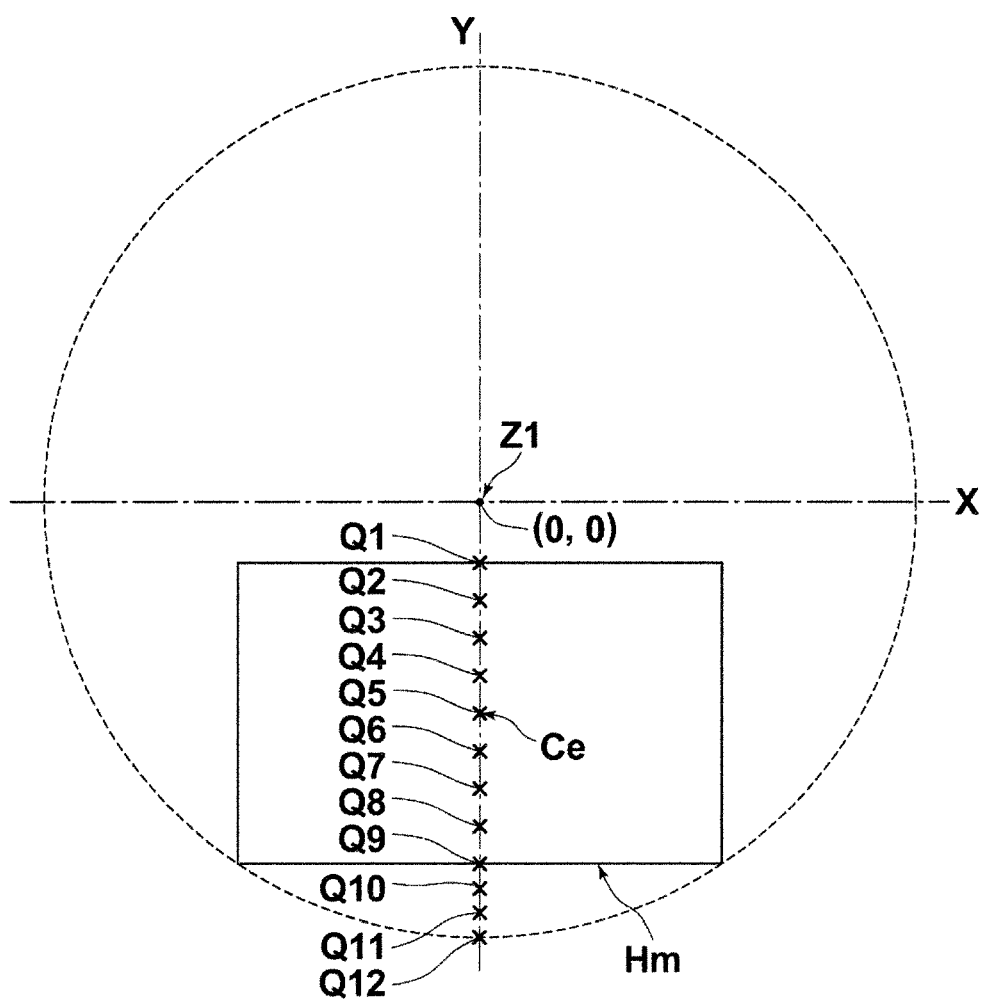

PROJECTION OPTICAL SYSTEM AND PROJECTION DISPLAY APPARATUS

CROSS REFERENCE TO RELATED APPLICATIONS

This application is a Bypass continuation of PCT/JP2012/001849 filed on Mar. 16, 2012, which claims priority to Japanese application No. 2011-069284 filed on Mar. 28, 2011. The entire contents of each of the above applications are hereby incorporated by reference.

BACKGROUND OF THE INVENTION

1. Field of the Invention

The present invention relates to a projection optical system in which a lens and a reflection mirror are arranged, and a projection display apparatus using the same.

2. Description of the Related Art

Projection display apparatuses (also called as projectors) for projecting an image displayed on a light valve have been spreading widely in recent years.

Projection optical systems used in such projectors are generally required to have a long back focus and the entrance pupil viewed from the reduction side (light valve side) needs to be sufficiently in the distance, i.e., the reduction side is required to have telecentricity.

Further, with the recent performance improvement of light valves, good aberration correction appropriate for the resolution of the light valve is demanded for the projection optical system. Further, brighter and wider angle projection optical systems are strongly demanded in consideration of the use in bright and narrow indoor spaces for presentations and the like.

Further, projection optical systems that combine a first optical system which is a dioptric system composed of a plurality of lenses and a second optical system which is a catoptric system composed of a convex mirror are also known as described, for example, in Japanese Unexamined Patent Publication No. 2008-096761 (Patent Document 1), Japanese Unexamined Patent Publication No. 2007-017707 (Patent Document 2), and Japanese Unexamined Patent Publication No. 2009-271372 (Patent Document 3).

For a projection optical system composed only of an ordinary dioptric system, if an attempt is made to broaden the angle of view by reducing the focal length, the lens size on the magnification side inevitably becomes excessively large. In the mean time, a projection optical system composed of a dioptric system and a catoptric system can be made relatively small in comparison with a projection optical system composed only of a dioptric system and is, therefore, suitable for broadening the angle of view by reducing the focal length (Patent Documents 1 to 3).

SUMMARY OF THE INVENTION

The projection optical system described in Patent Document 1, however, uses a decentered optical system in which a plurality of lenses is shifted or tiled with respect to the optical axis and is very difficult to assemble.

The projection optical system described in Patent Document 2 or 3 uses a coaxial optical system and is relatively easy to assemble. But, as it is designed mainly for use in a rear projector, if an attempt is made to mount it in a front projector, a problem arises that the distance between the refraction section formed only of a diopric system and the reflection section formed only of a catoptric system becomes large and the size of the projector is increased.

Further, if an attempt is made to reduce the length of the entire optical system in order to form a compact projection optical system suitable for mounting in a front projector, various aberrations, including distortion and the like, are expected to be aggravated and it is necessary to take measures to avoid this.

The present invention has been developed in view of the circumstances described above, and it is an object of the present invention to provide a compact projection optical system with a short overall length capable of favorably correcting aberrations, and a projection display apparatus using the same.

A projection optical system of the present invention is a projection optical system for magnifying and projecting an image formed on a conjugate plane on the reduction side to a conjugate plane on the magnification side, the projection optical system substantially consisting of a first optical system composed of a plurality of lenses and a second optical system composed of one reflection mirror having a convex aspherical surface arranged in this order from the reduction side, wherein the projection optical system satisfies a conditional expression (1): $0.1 < Zf/T12 < 1.0$, where T12 is an air space between the first optical system and the second optical system and Zf is a displacement in a direction of the optical axial from a position of maximum effective height on the magnification side lens surface of the lens disposed on the most magnification side in the first optical system to the vertex of the lens surface. Note that the displacement from the reduction side to the magnification side is taken as a positive displacement.

Preferably, the lens disposed on the most magnification side in the first optical system is an aspherical lens.

Preferably, the projection optical system satisfies a conditional expression (2): $0 < D/Zr < 1.0$, where D is an air space between the lens disposed on the most magnification side in the first optical system and a lens adjacent thereto in the first optical system and Zr is a displacement in a direction of the optical axis from a position of maximum effective height on the reduction side lens surface of the lens disposed on the most magnification side in the first optical system to the vertex of the lens surface. Note that the displacement from the reduction side to magnification side is taken as a positive displacement.

Two of the three lenses disposed on the most magnification side among the lenses constituting the first optical system may be aspherical lenses.

In the projection optical system described above, it is preferable that the reduction side of the entire lens system has telecentricity.

The term "telecentric on the reduction side" as used herein refers to, with respect to light fluxes emitted from arbitrary points on a conjugate plane on the reduction side and converged on a conjugate plane on the magnification side, that the angle bisector line on each luminous flux cross-section of the luminous flux emitted from the conjugate plane on the reduction side is nearly parallel with the optical axis. That is, this is not limited to the case of complete telecentricity, i.e., the angle bisector line is exactly parallel with the optical axis, and includes the case in which the angle bisector line is nearly parallel with the optical axis with some errors. The term "with some errors" as used herein refers to that the inclination of the angle bisector line with respect to the optical axis is within ±3°.

The luminous flux cross-section described above is a cross-section cut by a plane passing the optical axis. The angle bisector line is a bisecting line that divides the divergence angle on each luminous flux cross-section of the luminous flux emitted from the conjugate plane on the reduction side into equal halves.

All optical surfaces constituting the first and second optical systems may be formed so as to have rotationally symmetric shapes around one common axis.

A projection display apparatus of the present invention is a projection display apparatus, including a light source, a light valve, an illumination optical unit for guiding a luminous flux from the light source to the light valve, and the projection optical system described above, wherein the luminous flux from the light source is optically modulated by the light valve and the optically modulated luminous flux is projected onto a screen through the projection optical system.

According to the projection optical system and projection display apparatus of the present invention, a projection optical system for magnifying and projecting an image formed on a conjugate plane on the reduction side to a conjugate plane on the magnification side is provided with a first optical system composed of a plurality of lenses and a second optical system composed of one reflection mirror having a convex aspherical surface arranged in this order from the reduction side and configured to satisfy a conditional expression (1): $0.1 < Zf/T12 < 1.0$. This allows reduction in the entire length and downsizing of the optical system with satisfactorily corrected aberrations.

The conditional expression (1) is a formula to define the size of the entire projection optical system. If the projection optical system falls below the lower limit of the conditional expression (1), the air space T12 between the first and second optical systems becomes large with respect to the displacement Zf of the lens disposed on the most magnification side in the first optical system within the range in which the value is not zero or less, leading to a size increase. On the other hand, if the projection optical system exceeds the upper limit of the conditional expression (1), the air space T12 between the first and second optical systems becomes small with respect to the displacement Zf of the lens disposed on the most magnification side in the first optical system which is in the direction in which the entire length of the optical system is reduced. But, in order to avoid interference between light rays reflected from the second optical system and the lens disposed on the most magnification side described above, if the aforementioned displacement Zf of the lens is tried to be increased, the lens will have a shape which makes it difficult to manufacture the lens. If the reflection direction of the light rays reflected at the second optical system is shifted in order to avoid the interference with the lens disposed on the most magnification side described above, the increase in the shift amount leads to an increase in the size of the projection display apparatus.

BRIEF DESCRIPTION OF THE DRAWINGS

FIG. 2A is a cross-sectional view of a projection optical system of Example 1.

FIG. 2B illustrates distortion of the projection optical system of Example 1.

FIG. 2C illustrates spot diagrams of the projection optical system of Example 1.

FIG. 3A is a cross-sectional view of a projection optical system of Example 2.

FIG. 4A is a cross-sectional view of a projection optical system of Example 3.

FIG. 4B illustrates distortion of the projection optical system of Example 3.

FIG. 4C illustrates spot diagrams of the projection optical system of Example 3.

FIG. 5A is a cross-sectional view of a projection optical system of Example 4.

FIG. 5B illustrates distortion of the projection optical system of Example 4.

FIG. 5C illustrates spot diagrams of the projection optical system of Example 4.

FIG. 6A is a cross-sectional view of a projection optical system of Example 5.

FIG. 6B illustrates distortion of the projection optical system of Example 5.

FIG. 6C illustrates spot diagrams of the projection optical system of Example 5.

FIG. 7A is a cross-sectional view of a projection optical system of Example 6.

FIG. 7B illustrates distortion of the projection optical system of Example 6.

FIG. 7C illustrates spot diagrams of the projection optical system of Example 6.

FIG. 8A is a cross-sectional view of a projection optical system of Example 7.

FIG. 8B illustrates distortion of the projection optical system of Example 7.

FIG. 8C illustrates spot diagrams of the projection optical system of Example 7.

FIG. 9A is a cross-sectional view of a projection optical system of Example 8.

FIG. 10A is a cross-sectional view of a projection optical system of Example 9.

FIG. 10B illustrates distortion of the projection optical system of Example 9.

FIG. 10C illustrates spot diagrams of the projection optical system of Example 9.

FIG. 11 illustrates positions on a conjugate plane on the reduction side from which the spot diagrams are obtained.

DESCRIPTION OF THE PREFERRED EMBODIMENTS

Hereinafter, a projection optical system of the present invention and a projection display apparatus having the projection optical system will be described with reference to the accompanying drawings.

Figure 1:
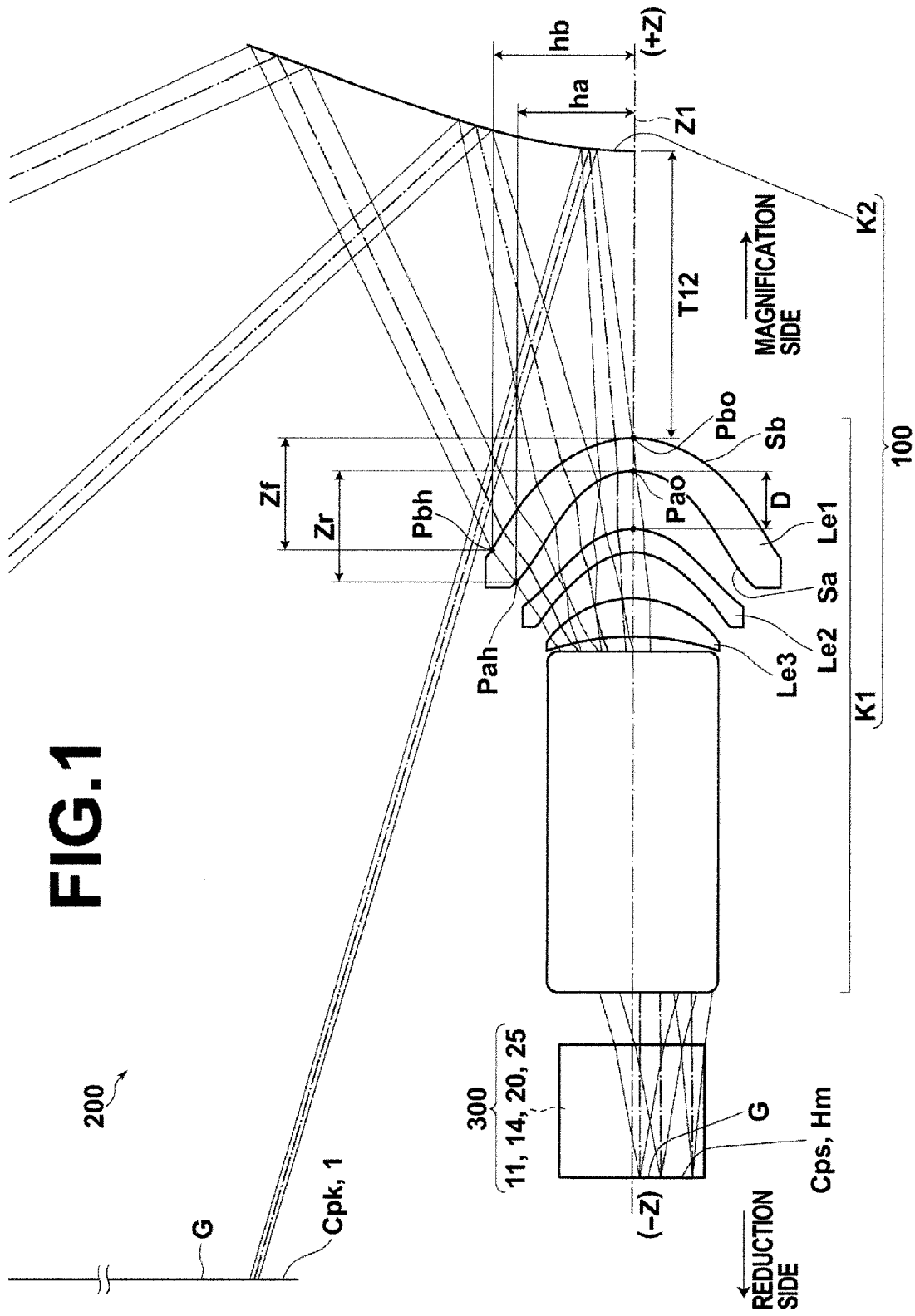
FIG. 1 is a diagram of a projection optical system according to an embodiment of the present invention and a projection display apparatus using the same, schematically illustrating the configuration thereof.
Figure 12:
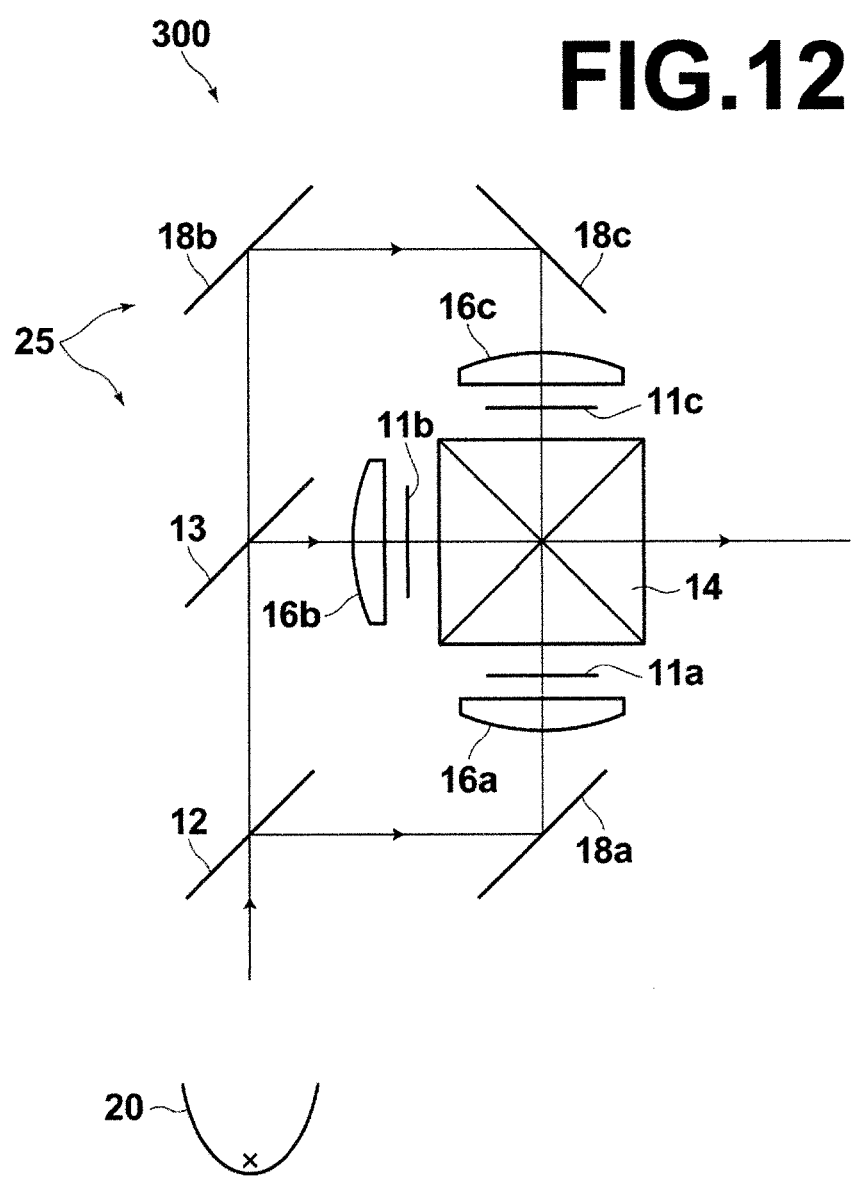
FIG. 12 illustrates a projection optical modulation unit of a projection display apparatus in an embodiment of the present invention.

FIG. 1 is a cross-sectional view of a projection optical system according to an embodiment of the present invention and a projection display apparatus using the same, schematically illustrating the configuration thereof. FIG. 12 illustrates a projection optical modulation unit 300.

The projection optical system 100 of the present invention illustrated in FIG. 1 is a projection optical system for magnifying and projecting an image G formed on a conjugate plane Cps on the reduction side (i.e., on an image forming surface Hm of a display element) to a conjugate plane Cpk on the magnification side (i.e., to a screen 1).

The projection optical system 100 substantially consists of a first optical system K1 which is a dioptric system composed of a plurality of lenses and a second optical system K2 which is a catoptrics system composed of one reflection mirror having a convex aspherical surface arranged in this order from the reduction side.

The projection optical system 100 satisfies a conditional expression (1): $0.1 < Zf/T12 < 1.0$, where T12 is an air space between the first optical system K1 and the second optical system K2 (mm) and Zf is a displacement (mm) in a direction of the optical axial Z1 from a position Pbh of maximum effective height hb on the magnification side lens surface Sb of the lens Le1 disposed on the most magnification side in the first optical system K1 to the vertex Pbo of the lens surface Sb.

The displacement of the lens surface Sb is a value when a displacement from the reduction side to magnification side is taken as a positive displacement and a displacement from the magnification side to reduction side is taken as a negative displacement. That is, the value of Zf is positive if the vertex Pbo is located on the magnification side of the position Pbh while the value of Zf is negative if the vertex Pbo is located on the reduction side of the position Pbh.

Preferably, the lens Le1 disposed on the most magnification side in the first optical system K1 is an aspherical lens.

Preferably, the projection optical system 100 satisfies a conditional expression (2): $0 < D/Zr < 1.0$, where D is an air space between the lens Le1 disposed on the most magnification side in the first optical system K1 and a lens Le2 adjacent thereto in the first optical system K1. That is, the lens Le2 is a lens adjacently disposed on the reduction side of the lens Le1.

The conditional expression (2) defines the distance between the lens Le1 disposed on the most magnification side in the first optical system K1 and the lens le2 adjacent to the lens Le1 in the first optical system K1. By satisfying the conditional expression (2), the entire size of the first optical system K1 which is a dioptric system may be reduced.

Zr is a displacement (mm) in a direction of the optical axis Z1 from a position Pah of maximum effective height ha on the reduction side lens surface Sa of the lens Le1 to the vertex of the lens surface Sa. The displacement of the lens surface is a value when a displacement from the reduction side to magnification side is taken as a positive displacement and a displacement from the magnification side to reduction side is taken as a negative displacement, and the value of Zf is positive if the vertex Pao is located on the magnification side of the position Pah while the value of Zf is negative if the vertex Pao is located on the reduction side of the position Pah, as in the case described above.

Preferably, any two of the three lenses Le1, Le2, Le3 disposed on the most magnification side in the first optical system K1 are aspherical lenses.

Further, it is preferable that the entire lens system substantially consisting of the first optical system K1 and the second optical system K2 is configured to be telecentric on the reduction side.

Preferably, all optical surfaces constituting the first optical system K1 and the second optical system K2 are formed so as to have rotationally symmetric shapes around one common axis of the optical axis Z1. That is, it is preferable that all optical surfaces constituting the first optical system K1 and the second optical system K2 are rotationally symmetric surfaces.

A projection display apparatus of the present invention using the projection optical system described above will now be described.

A projection display apparatus 200 of the present invention illustrated in FIG. 1 includes a projection optical modulation unit 300 having a light source 20, a light valve 11, and the like, and the aforementioned projection optical system 100. The apparatus is configured to optically modulate a luminous flux emitted from the light source 30 with the light valve 11 and to project the optically modulated luminous flux to the screen 1 through the projection optical system 100.

The projection optical modulation unit 300 illustrated in FIG. 12 includes the light source 20, transmissive liquid crystal panels 11*a*, 11*b*, and 11*c*, which are light valves, an illumination optical unit 25 for guiding a luminous flux emitted from the light source 20 to each of the transmissive liquid crystal panels 11*a* to 11*c*, and a cross dichroic prism 14 which is a luminous flux combining optical system for combining luminous fluxes passing through the transmissive liquid crystal panels 11*a* to 11*c*. The illumination optical unit 25 includes an integrator (not shown) such as a fly's eye disposed between the light source 20 and dichroic mirror 12.

A white luminous flux emitted from the light source 20 is separated into three luminous fluxes of different colors (G light, B light, R light) through the illumination optical unit 25 and separated luminous fluxes are inputted to the corresponding liquid crystal panels 11*a* to 11*c* and optically modulated.

The respective luminous fluxes optically modulated through the liquid crystal panels 11*a* to 11*c* are color-combined by the cross dichroic prism 14 and the combined luminous flux is projected onto the screen 1 through the projection optical system 100.

The illumination optical unit 25 of the projection optical modulation unit 300 includes dichroic mirrors 12, 13 for color separation, total reflection mirrors 18*a*, 18*b*, 18*c*, and condenser lenses 16*a*, 16*b*, 16*c*.

The projection optical modulation unit 300 is not limited to that using the transmissive liquid crystal display panels described above, and other optical modulation means, such as reflective liquid crystal display panels, DMDs, or the like may also be employed.

EXAMPLES

Hereinafter, specific Examples 1 to 9 of the projection optical system of the present invention will be described with reference to FIGS. 2A-C through FIG. 11, and Tables 1A-B through Table 10.

FIGS. 2A, 3A, 4A, 5A, 6A, 7A, 8A, 9A, and 10A are cross-sectional views of the projection optical systems of the respective examples. FIGS. 2B, 3B, 4B, 5B, 6B, 7B, 8B, 9B, and 10B illustrate distortions representing optical performance of the projection optical systems of the respective examples. FIGS. 2C, 3C, 4C, 5C, 6C, 7C. 8C, 9C, and 10C illustrate spot diagrams representing optical performance of the projection optical systems of the respective examples. FIG. 11 illustrates positions on a conjugate plane on the reduction side from which the spot diagrams are obtained.

Tables 1A, 2A, 3A, 4A, 5A, 6A, 7A, 8A, and 9A show lens data of the projection optical systems of the respective examples. Tables 1B, 2B, 3B, 4B, 5B, 6B, 7B, 8B, and 9B show aspherical surface data representing the shapes of aspherical surfaces constituting the projection optical systems of the respective examples. Table 10 given at the end of the examples shows a value of Zf/T12 in the conditional expression (1) and a value of D/Zr in the conditional expression (2) of the projection optical system of each example.

Each of the projection optical systems of Examples 1 to 9 substantially consists of a first optical system K1 composed of a plurality of lenses and a second optical system K2 composed of one reflection mirror having a convex aspherical surface arranged in this order from the reduction side, in which an image G formed on a conjugate plane on the reduction side is magnified and projected onto a conjugate plane on the magnification side. In each drawing illustrating each example, components identical and corresponding to those of the projection optical system 100 described above are given the same reference designator and will not be elaborated upon further here.

The projection optical modulation unit 300 shown in each drawing has the same configuration as that of the projection optical modulation unit 300 already described and shown in FIGS. 1 and 12, and also will not be elaborated upon further here.

Aspherical surface coefficients of the projection optical systems of Examples 1 to 9 shown in Tables 1B, 2B, 3B, 4B, 5B, 6B, 7B, 8B, and 9B are created such that aspherical surfaces are determined when applied to an aspherical surface expression given below:

$$Z = \frac{Y^2/R}{1 + (1 - K \cdot Y^2/R^2)^{1/2}} + \sum_{i=3}^{n} Ai \cdot Y^i$$

where,

Z is a depth of aspherical surface (length of perpendicular line from a point on an aspherical surface at height Y to a tangent plane to the vertex of the aspherical surface perpendicular to the optical axis) (mm);

Y is a height (distance from the optical axis) mm;

R is a paraxial radius of curvature (mm); and

K, Ai are aspherical surface coefficients (i=3 to n).

Note that each of the projection optical systems of Examples 1 to 9 satisfies both the conditional expressions (1) and (2).

Example 1

FIG. 2A is a cross-sectional view of a projection optical system of Example 1, illustrating the cross-section thereof.

The projection optical system of Example 1 substantially consists of a first optical system K1 composed of four lens groups and a second optical system K2 which is an aspherical reflection mirror arranged in this order from the reduction side.

As illustrated in FIG. 2A, the first optical system K1 has four lens groups (first lens group G1 to fourth lens group G4). When the projection distance is changed, the distance between each of the four lens groups is changed for focus adjustment.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 1A).

The projection optical system of Example 1 is formed such that all optical surfaces constituting the first optical system K1 and the second optical system K2 have rotationally symmetric shapes around a common axis (optical axis Z1).

As is known from Table 10 that indicates values of the formula Zf/T12 in the conditional expression and values of the formula D/Zr in the conditional expression (2), the projection optical system of Example 1 satisfies both the conditional expressions (1) and (2).

Next, Tables 1A and 1B that respectively indicate lens data and aspherical surface coefficients of the projection optical system of Example 1 will be described.

TABLE 1A

Example 1
Lens Data

| Surface No. | R | D | Nd | vd |
|---|---|---|---|---|
| 1 | ∞ | 32.0000 | 1.5163 | 64.14 |
| 2 | ∞ | 13.5576 | | |
| 3 | 38.1204 | 10.2898 | 1.8052 | 25.42 |
| 4 | −104.1912 | 0.4006 | | |
| 5* | 231.1613 | 3.5006 | 1.4910 | 57.58 |
| 6* | 139.9131 | 0.5066 | | |
| 7 | 33.0349 | 1.4509 | 1.6889 | 31.07 |
| 8 | 17.6985 | 13.5331 | 1.4970 | 81.54 |
| 9 | −43.1689 | 0.1997 | | |
| 10 | −148.3689 | 7.9447 | 1.6779 | 55.34 |
| 11 | −17.1134 | 1.2004 | 1.8052 | 25.42 |
| 12 | 35.8857 | 5.5800 | | |
| 13 (Aperture) | ∞ | 8.4272 | | |
| 14 | 61.2724 | 5.7483 | 1.7859 | 44.20 |
| 15 | −35.2129 | 0.5276 | | |
| 16 | 36.4717 | 8.5159 | 1.5955 | 39.24 |
| 17 | −22.6134 | 1.2504 | 1.8340 | 37.16 |
| 18 | 26.5447 | 11.3398 | | |
| 19 | −21.2023 | 1.5506 | 1.5163 | 64.14 |
| 20 | −1299.4069 | 2.5899 | | |
| 21 | −63.7842 | 9.1796 | 1.8052 | 25.42 |
| 22 | −25.6386 | 11.0333 | | |
| 23* | −13.4421 | 6.6884 | 1.4910 | 57.58 |
| 24* | −11.5276 | 12.8589 | | |
| 25* | −17.7885 | 6.1068 | 1.4910 | 57.58 |
| 26* | −264.3841 | 70.7012 | | |
| 27* | 105.5115 | −573.0000 | (Reflection Surface) | |

*Aspherical

Table 1A shows a radius of curvature R of an optical surface of each of the optical members constituting the projection optical system of Example 1, a thickness of each of the optical members on the optical axis Z1, an air space D between each of the lenses on the optical axis Z1, and a refractive index Nd and an Abbe number vd of each of the optical members with respect to d-line. Note that the radii of curvature of the aspherical surfaces are those in the paraxial region. Further, the lens data include the projection optical modulation unit 300 as a plane parallel plate.

Values of the radii of curvature R and the air spaces D are actual lengths (in mm unit).

The numbers under the "Surface No." in Table 1A are surface numbers of optical members (lens surfaces, aperture stop, reflection mirror, and the like) which are sequentially increased from the reduction side to the magnification side. Values under the symbols "R", "D", "Nd", and "vd" are values indicated in association with the "Surface No.".

The values under the "Nd" represent refractive indices of the respective optical elements (lenses) whose surface numbers are sequentially increased from the reduction side to the magnification side with respect to d-line. The values under the "vd" represent Abbe numbers of the respective optical elements (lenses) whose surface numbers are sequentially increased from the reduction side to the magnification side with reference to d-line.

The lens data are, as can be seen from the data value described therein, those under the state in which the distance from the reflection mirror surface to the projection surface (conjugate plane on the magnification side, screen) is set to 573 mm and focused.

Further, each aspherical surface coefficient representing the shape of each aspherical surface constituting the projection optical system of Example 1 is shown in Table 1B given below.

symbols Q1 to Q12 in FIG. 2C are obtained according to the positions represented by the symbols Q1 to Q12 in FIG. 11. Note that, in FIG. 11, the position of the optical axis Z1 is set at the origin (0, 0) which is the intersection point of the X axis and Y axis, and the positions Q1 to Q12 are set so as to longitudinally traverse on the image forming surface Hm in the lower side of the origin in the drawing along the Y axis. Here, the position Q1 is set at the top of the range of the image forming surface Hm in FIG. 11, the position Q9 is set at the bottom of the range of the image forming surface Hm, and the position Q5 is set at the center Ce of the range of the image forming surface Hm.

As is clear from Tables 1A, 1B and FIGS. 2A, 2B, 2C, and the like, the projection optical system of Example 1 is a

TABLE 1B

Example 1
Aspherical Surface Coefficier

| Symbol | Surface No. | | | | | | |
|---|---|---|---|---|---|---|---|
| | 5* | 6* | 23* | 24* | 25* | 26* | 27* |
| K | −5.17118E+02 | 5.13212E+01 | 2.47865E−01 | 1.58995E−01 | −2.96840E+00 | −2.11564E+19 | 7.60649E−01 |
| A3 | −2.02572E−05 | −4.71920E−05 | −8.80375E−05 | −2.66110E−04 | −9.03215E−04 | −7.73204E−04 | −2.31355E−05 |
| A4 | −4.85008E−06 | 5.60668E−06 | 1.57319E−05 | 6.47256E−05 | −1.91850E−05 | −2.34330E−05 | −1.27551E−07 |
| A5 | −2.15724E−08 | 1.05744E−07 | 1.64836E−06 | −7.78050E−07 | 3.77324E−07 | 1.68221E−06 | 5.85990E−08 |
| A6 | 9.74768E−09 | 1.45260E−09 | −1.68939E−08 | −7.59867E−09 | 9.54829E−09 | −2.28809E−08 | −2.39509E−09 |
| A7 | −2.86523E−10 | −3.20172E−11 | −2.32269E−09 | 8.12309E−10 | 1.39154E−10 | −4.49670E−10 | 1.80846E−11 |
| A8 | −3.00427E−11 | −2.98077E−12 | −4.79864E−11 | 1.37898E−11 | 3.19468E−12 | 1.03880E−12 | 7.77876E−13 |
| A9 | −7.73194E−13 | −5.62949E−13 | 4.13562E−12 | −2.11787E−13 | 1.23243E−13 | 2.51127E−13 | −1.83675E−14 |
| A10 | 1.12009E−14 | −1.40760E−13 | 2.02517E−13 | −1.94450E−14 | 3.60020E−15 | 6.10172E−15 | 1.03035E−16 |
| A11 | 2.09139E−15 | −3.69880E−15 | 1.25107E−15 | −2.10435E−16 | 1.31120E−16 | 3.06527E−17 | 1.83993E−19 |
| A12 | −1.06654E−17 | 2.05956E−16 | −7.32670E−16 | 2.61860E−17 | 1.75130E−18 | −1.66346E−18 | 1.38247E−20 |
| A13 | −2.37973E−19 | 9.17336E−19 | 4.36738E−18 | −5.13486E−19 | 5.63254E−21 | −9.24817E−20 | −2.34464E−22 |
| A14 | −1.95328E−20 | 1.62330E−19 | 2.52835E−19 | −7.70995E−21 | −1.98584E−21 | −2.45621E−21 | −5.22611E−25 |
| A15 | −2.26641E−21 | 7.11570E−21 | 4.70681E−21 | 2.68068E−22 | −9.04328E−23 | −3.60021E−23 | 4.19015E−27 |
| A16 | 1.42842E−22 | −9.96147E−22 | −3.69318E−23 | 1.83931E−23 | −3.90284E−24 | 3.33498E−25 | 4.01782E−28 |
| A17 | | | 3.35169E−23 | 1.29543E−24 | −1.22258E−25 | 4.19190E−26 | −3.05002E−30 |
| A18 | | | −1.61290E−24 | 3.74238E−26 | −2.63731E−27 | 1.40872E−27 | −2.49744E−32 |
| A19 | | | −2.50426E−26 | 2.50679E−29 | −1.35277E−29 | 2.09071E−29 | 3.50844E−34 |
| A20 | | | 2.21295E−27 | −6.19800E−29 | 4.47096E−30 | −1.04461E−30 | −1.06818E−36 |

FIG. 2B, 2C illustrate distortion and spot diagrams of the projection optical system of Example 1 respectively.

FIG. 2B is a drawing that indicates the distortion of projection optical system of Example 1 as a distortion of distortion grid extending over the entire projectable range. It is known from FIG. 2B that the distortion of the grid is a visually unrecognizable level over the entire projectable range.

FIG. 2C illustrates, as spot diagrams, point images obtained by projecting points on a conjugate plane on the reduction side to a conjugate plane on the magnification side.

Symbols Q1, Q2, Q3, Q4, Q5, Q6, Q7, Q8, Q9, Q10, Q11, and Q12 shown on the left side of frames enclosing the respective spot diagrams correspond to positions on the conjugate plane Cps (image forming surface Hm).

More specifically, as shown in FIG. 11 which illustrates the appearance of the image forming surface Hm (conjugate plane Cps on the reduction side) viewed from the magnification side, positions on the conjugate plane Cps on the reduction side for obtaining spot diagrams are twelve points of Q1 to Q12 which are set so as to traverse longitudinally in the Y axis direction (direction passing through the optical axis Z1 and orthogonal thereto) on the image forming surface Hm. The positions Q1 to Q12 are set such that the greater the number in the symbol, the greater the absolute value of the Y coordinate. Spot diagrams in the frames indicated by the compact with a short overall length and high performance optical system capable of favorably correcting chromatic aberration and distortion.

Note that the above descriptions of how to understand the lens data, spot diagrams, drawings indicating distortion and the like, and tables apply also to Examples 2 to 9 described herein below.

Example 2

FIG. 3A is a cross-sectional view of a projection optical system of Example 2, illustrating the cross-section thereof.

The projection optical system of Example 2 also substantially consists of a first optical system K1 composed of four lens groups and a second optical system K2 which is an aspherical reflection mirror arranged in this order from the reduction side.

As illustrated in FIG. 3A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 2A).

The projection optical system of Example 2 is formed such that all optical surfaces constituting the first optical system K1 and the second optical system K2 have rotationally symmetric shapes around a common axis (optical axis Z1).

As is known from Table 10, the projection optical system of Example 2 satisfies both the conditional expressions (1) and (2).

Tables 2A, 2B that respectively indicate lens data and aspherical surface coefficients of the projection optical system of Example 2 are given below.

The lens data are, as can be seen from the data value described therein, those under the state in which the distance from the reflection mirror surface to the projection surface (conjugate plane on the magnification side, screen) is set to 573 mm and focused.

TABLE 2A

Example 2
Lens Data

| Surface No. | R | D | Nd | vd |
|---|---|---|---|---|
| 1 | ∞ | 32.0000 | 1.5163 | 64.14 |
| 2 | ∞ | 13.5649 | | |
| 3 | 38.9322 | 9.9291 | 1.8052 | 25.42 |
| 4 | −100.8997 | 0.3009 | | |
| 5* | 160.3467 | 3.5000 | 1.4910 | 57.58 |
| 6* | 144.1330 | 0.5832 | | |
| 7 | 38.0917 | 1.4507 | 1.6398 | 34.46 |
| 8 | 17.8153 | 13.5111 | 1.4970 | 81.54 |
| 9 | −38.7799 | 0.2010 | | |
| 10 | −120.6792 | 7.8123 | 1.6516 | 58.55 |
| 11 | −17.3849 | 1.1994 | 1.8052 | 25.42 |
| 12 | 37.4174 | 5.8800 | | |

TABLE 2A-continued

Example 2
Lens Data

| Surface No. | R | D | Nd | vd |
|---|---|---|---|---|
| 13 (Aperture) | ∞ | 7.9850 | | |
| 14 | 67.9099 | 5.3851 | 1.7725 | 49.60 |
| 15 | −35.2544 | 3.6684 | | |
| 16 | 39.5852 | 8.6990 | 1.5481 | 45.79 |
| 17 | −21.5727 | 1.2508 | 1.7859 | 44.20 |
| 18 | 29.5920 | 10.8824 | | |
| 19 | −23.2275 | 1.5491 | 1.5163 | 64.14 |
| 20 | 987.5693 | 2.6480 | | |
| 21 | −75.5954 | 10.0741 | 1.8052 | 25.42 |
| 22 | −26.1429 | 9.0981 | | |
| 23* | −13.1472 | 6.6337 | 1.4910 | 57.58 |
| 24* | −11.5707 | 12.3840 | | |
| 25* | −17.0201 | 6.0007 | 1.4910 | 57.58 |
| 26* | −262.2886 | 65.4871 | | |
| 27* | 107.7456 | −573.0000 | (Reflection Surface) | |

*Aspherical

TABLE 2B

Example 2
Aspherical Surface Coefficier

| | Surface No. | | | | | | |
|---|---|---|---|---|---|---|---|
| Symbol | 5* | 6* | 23* | 24* | 25* | 26* | 27* |
| K | −1.63447E+02 | 5.23729E+01 | 2.35657E−01 | 1.61044E−01 | −2.84753E+00 | −2.11564E+19 | 7.65732E−01 |
| A3 | −2.60759E−06 | −2.28856E−05 | −5.10713E−05 | −2.42398E−04 | −9.01939E−04 | −7.62578E−04 | −2.24969E−05 |
| A4 | −3.90895E−06 | 6.33805E−06 | 1.21696E−05 | 6.63240E−05 | −1.96038E−05 | −2.25102E−05 | −1.31593E−07 |
| A5 | −4.14765E−08 | 9.66429E−08 | 1.98897E−06 | −7.38265E−07 | 3.73840E−07 | 1.64204E−06 | 5.86170E−08 |
| A6 | 7.38772E−09 | −1.63572E−09 | −2.34554E−08 | −6.74886E−09 | 9.62218E−09 | −2.26224E−08 | −2.39488E−09 |
| A7 | −3.95340E−10 | −1.44260E−10 | −2.37789E−09 | 8.26080E−10 | 1.46123E−10 | −4.36597E−10 | 1.80866E−11 |
| A8 | −3.42856E−11 | −3.05997E−12 | −4.44130E−11 | 1.37758E−11 | 3.57107E−12 | 1.21646E−12 | 7.77894E−13 |
| A9 | −9.13313E−13 | −5.91716E−13 | 4.30845E−12 | −2.24084E−13 | 1.39519E−13 | 2.51165E−13 | −1.83674E−14 |
| A10 | 1.14953E−14 | −1.40242E−13 | 2.06540E−13 | −2.01022E−14 | 4.25173E−15 | 6.09158E−15 | 1.03036E−16 |
| A11 | 2.25548E−15 | −3.84000E−15 | 1.23045E−15 | −2.34019E−16 | 1.54365E−16 | 2.99953E−17 | 1.83997E−19 |
| A12 | −1.26798E−17 | 2.26304E−16 | −7.41194E−16 | 2.55361E−17 | 2.54651E−18 | −1.70719E−18 | 1.38247E−20 |
| A13 | | | 3.74461E−18 | −5.24841E−19 | 3.03296E−20 | −9.42189E−20 | −2.34465E−22 |
| A14 | | | 2.20442E−19 | −7.53376E−21 | −1.26304E−21 | −2.51963E−21 | −5.22619E−25 |
| A15 | | | 3.31888E−21 | 2.94632E−22 | −7.24686E−23 | −3.79307E−23 | 4.19007E−27 |
| A16 | | | −8.60615E−23 | 2.03503E−23 | −3.57030E−24 | 2.84469E−25 | 4.01782E−28 |
| A17 | | | 3.24686E−23 | 1.39249E−24 | −1.22366E−25 | 4.09566E−26 | −3.05002E−30 |
| A18 | | | −1.58602E−24 | 4.12223E−26 | −3.10603E−27 | 1.40180E−27 | −2.49744E−32 |
| A19 | | | −1.97036E−26 | 1.64913E−28 | −4.59577E−29 | 2.15248E−29 | 3.50845E−34 |
| A20 | | | 2.67664E−27 | −5.90507E−29 | 2.77150E−30 | −9.97313E−31 | −1.06816E−36 |

Figure 3B:
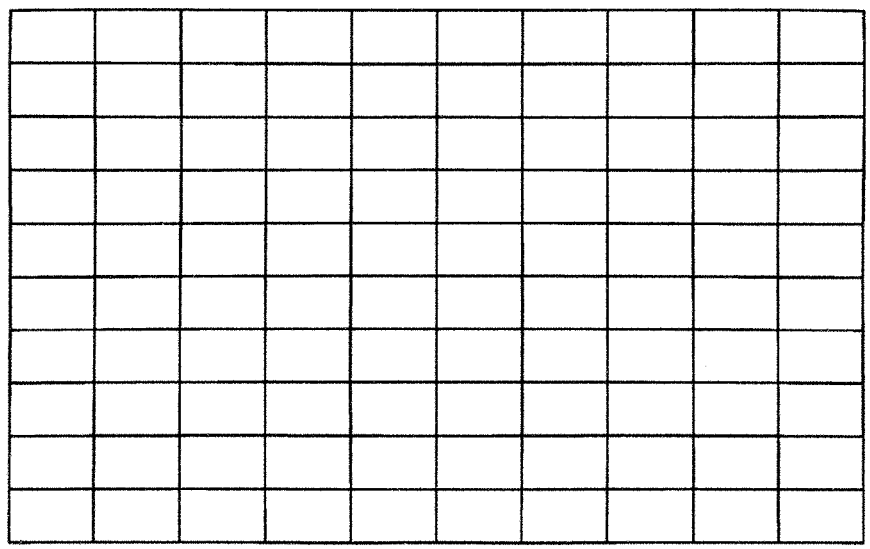
FIG. 3B illustrates distortion of the projection optical system of Example 2.
Figure 3C:
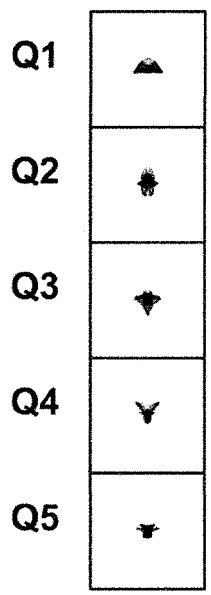
FIG. 3C illustrates spot diagrams of the projection optical system of Example 2.

FIGS. 3B, 3C illustrate distortion and spot diagrams of the projection optical system of Example 2 respectively.

As is clear from FIGS. 3A, 3B, 3C and Tables 2A, 2B, the projection optical system of Example 2 is a compact with a short overall length and high performance optical system capable of favorably correcting chromatic aberration and distortion.

Example 3

FIG. 4A is a cross-sectional view of a projection optical system of Example 3, illustrating the cross-section thereof.

The projection optical system of Example 3 also substantially consists of a first optical system K1 composed of four lens groups and a second optical system K2 which is an aspherical reflection mirror arranged in this order from the reduction side.

As illustrated in FIG. 4A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by six lenses indicated by symbols L1, L2, L3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 3A).

The projection optical system of Example 3 is formed such that all optical surfaces constituting the first optical system K1 and the second optical system K2 have rotationally symmetric shapes around a common axis (optical axis Z1).

As is known from Table 10, the projection optical system of Example 3 satisfies both the conditional expressions (1) and (2).

Tables 3A, 3B that respectively indicate lens data and aspherical surface coefficients of the projection optical system of Example 3 are given below.

The lens data are, as can be seen from the data value described therein, those under the state in which the distance from the reflection mirror surface to the projection surface (conjugate plane on the magnification side, screen) is set to 573 mm and focused.

TABLE 3A

Example 3
Lens Data

| Surface No. | R | D | Nd | vd |
|---|---|---|---|---|
| 1 | ∞ | 32.0000 | 1.5163 | 64.14 |
| 2 | ∞ | 13.5545 | | |
| 3 | 47.3915 | 9.1132 | 1.8467 | 23.78 |
| 4 | −95.8752 | 0.5093 | | |
| 5* | 1261.6982 | 3.9532 | 1.4910 | 57.58 |
| 6* | 132.1767 | 0.3998 | | |
| 7 | 34.5179 | 1.4491 | 1.6889 | 31.07 |

TABLE 3A-continued

Example 3
Lens Data

| Surface No. | R | D | Nd | vd |
|---|---|---|---|---|
| 8 | 18.2033 | 15.4141 | 1.4970 | 81.54 |
| 9 | −38.7607 | 0.1991 | | |
| 10 | −99.6791 | 6.9616 | 1.6968 | 55.53 |
| 11 | −23.7129 | 1.1991 | 1.8467 | 23.78 |
| 12 | 56.2554 | 8.8700 | | |
| 13 (Aperture) | ∞ | 9.0293 | | |
| 14 | 51.2680 | 6.1446 | 1.7130 | 53.87 |
| 15 | −46.4335 | 3.7936 | | |
| 16 | 38.9667 | 10.4404 | 1.5814 | 40.75 |
| 17 | −24.0084 | 2.5079 | 1.8348 | 42.71 |
| 18 | 28.9282 | 10.8054 | | |
| 19 | −26.3492 | 1.5491 | 1.6516 | 58.55 |
| 20 | −187.9535 | 0.5448 | | |
| 21 | −120.8037 | 7.2796 | 1.8467 | 23.78 |
| 22 | −30.7965 | 12.5899 | | |
| 23* | −12.2997 | 6.4616 | 1.4910 | 57.58 |
| 24* | −11.5851 | 15.7858 | | |
| 25* | −18.0867 | 5.9994 | 1.4910 | 57.58 |
| 26* | −383.0006 | 53.0010 | | |
| 27* | 108.6321 | −573.0000 | (Reflection Surface) | |

*Aspherical

TABLE 3B

Example 3
Aspherical Surface Coefficier

| | Surface No. | | | | | | |
|---|---|---|---|---|---|---|---|
| Symbol | 5* | 6* | 23* | 24* | 25* | 26* | 27* |
| K | −1.91527E+05 | 3.51731E+01 | 2.07892E−01 | 1.50141E−01 | −3.38000E+00 | −2.11564E+19 | 7.15716E−01 |
| A3 | 8.51333E−05 | 3.35077E−05 | −2.18512E−04 | −3.01729E−04 | −9.76793E−04 | −7.29692E−04 | −1.93331E−05 |
| A4 | −3.09124E−06 | 1.01727E−05 | 2.05199E−05 | 5.85251E−05 | −1.94797E−05 | −2.69126E−05 | −1.61655E−07 |
| A5 | 1.18847E−07 | 1.92291E−07 | 1.82517E−06 | −7.24820E−07 | 1.01355E−07 | 1.60547E−06 | 5.84202E−08 |
| A6 | 1.15797E−08 | 3.41993E−09 | −2.61242E−08 | −1.20775E−08 | −3.65208E−09 | −2.45364E−08 | −2.39382E−09 |
| A7 | −4.30500E−10 | −2.01323E−10 | −2.60321E−09 | 9.99964E−10 | −2.23763E−10 | −4.80158E−10 | 1.80996E−11 |
| A8 | −4.21111E−11 | −1.89262E−11 | −4.03365E−11 | 1.69961E−11 | −3.20825E−12 | 6.45159E−13 | 7.78011E−13 |
| A9 | −1.36160E−12 | −1.12284E−12 | 4.96907E−12 | −2.13168E−13 | 1.56982E−13 | 2.61076E−13 | −1.83665E−14 |
| A10 | −2.89907E−15 | −1.56911E−13 | 2.38143E−13 | −2.29076E−14 | 1.09956E−14 | 7.42843E−15 | 1.03035E−16 |
| A11 | 2.30887E−15 | −2.81306E−15 | 2.22161E−15 | −4.39048E−16 | 5.38131E−16 | 2.79067E−18 | 1.83954E−19 |
| A12 | 4.69213E−17 | 3.02434E−16 | −7.25327E−16 | 1.51720E−17 | 1.91984E−17 | −2.17897E−18 | 1.38240E−20 |
| A13 | 3.58382E−18 | 7.74963E−18 | 3.00651E−18 | −9.77451E−19 | 5.09907E−19 | −1.26037E−19 | −2.34472E−22 |
| A14 | 6.02563E−20 | 4.99275E−19 | 1.45206E−19 | −2.51941E−20 | 9.77583E−21 | −2.05555E−21 | −5.22665E−25 |
| A15 | −2.72639E−21 | 1.24487E−20 | −9.70622E−22 | −3.01380E−22 | −9.66262E−23 | −1.02277E−23 | 4.19007E−27 |
| A16 | −3.53207E−22 | −2.48936E−21 | −2.55161E−22 | 2.27477E−24 | −2.38915E−23 | 1.93401E−24 | 4.01787E−28 |
| A17 | | | 2.68879E−23 | 1.04507E−24 | −1.50468E−24 | 7.61656E−26 | −3.04993E−30 |
| A18 | | | −1.588884E−24 | 4.72810E−26 | −9.06632E−26 | 1.78437E−27 | −2.49735E−32 |
| A19 | | | −4.19285E−27 | 1.36337E−27 | −4.26075E−27 | −3.18516E−29 | 3.50848E−34 |
| A20 | | | 3.95610E−27 | 3.42773E−29 | −1.94652E−28 | −4.87944E−30 | −1.06829E−36 |

FIGS. 4B, 4C illustrate distortion and spot diagrams of the projection optical system of Example 3 respectively.

As is clear from FIGS. 4A, 4B, 4C and Tables 3A, 3B, the projection optical system of Example 3 is a compact with a short overall length and high performance optical system capable of favorably correcting chromatic aberration and distortion.

Example 4

FIG. 5A is a cross-sectional view of a projection optical system of Example 4, illustrating the cross-section thereof.

The projection optical system of Example 4 also substantially consists of a first optical system K1 composed of four lens groups and a second optical system K2 which is an aspherical reflection mirror arranged in this order from the reduction side.

As illustrated in FIG. 5A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 4A).

The projection optical system of Example 4 is formed such that all optical surfaces constituting the first optical system K1 and the second optical system K2 have rotationally symmetric shapes around a common axis (optical axis Z1).

As is known from Table 10, the projection optical system of Example 4 satisfies both the conditional expressions (1) and (2).

Tables 4A, 4B that respectively indicate lens data and aspherical surface coefficients of the projection optical system of Example 4 are given below.

The lens data are, as can be seen from the data value described therein, those under the state in which the distance from the reflection mirror surface to the projection surface (conjugate plane on the magnification side, screen) is set to 573 mm and focused.

TABLE 4A

Example 4
Lens Data

| Surface No. | R | D | Nd | vd |
|---|---|---|---|---|
| 1 | ∞ | 32.0000 | 1.5163 | 64.14 |
| 2 | ∞ | 13.5785 | | |
| 3 | 39.8093 | 9.6007 | 1.8467 | 23.78 |
| 4 | −129.9773 | 0.1998 | | |

TABLE 4A-continued

Example 4
Lens Data

| Surface No. | R | D | Nd | vd |
|---|---|---|---|---|
| 5* | 359.3582 | 3.4135 | 1.4910 | 57.58 |
| 6* | 135.1747 | 0.1991 | | |
| 7 | 25.9518 | 1.9075 | 1.7400 | 28.30 |
| 8 | 17.5154 | 13.9539 | 1.4970 | 81.54 |
| 9 | −39.2692 | 0.1990 | | |
| 10 | −66.4654 | 7.4407 | 1.6779 | 55.34 |
| 11 | −15.6767 | 1.1991 | 1.8467 | 23.78 |
| 12 | 38.0214 | 4.9400 | | |
| 13 (Aperture) | ∞ | 6.5216 | | |
| 14 | 58.4974 | 5.8193 | 1.7205 | 34.71 |
| 15 | −29.8304 | 0.5654 | | |
| 16 | 34.0192 | 8.9406 | 1.5955 | 39.24 |
| 17 | −19.5683 | 1.1991 | 1.8000 | 29.84 |
| 18 | 28.0561 | 10.6244 | | |
| 19 | −20.5460 | 1.4991 | 1.6228 | 57.05 |
| 20 | 17428.2435 | 1.5654 | | |
| 21 | −100.0262 | 9.9608 | 1.8467 | 23.78 |
| 22 | −23.7340 | 7.2801 | | |
| 23* | −12.1728 | 9.4285 | 1.4910 | 57.58 |
| 24* | −11.3306 | 9.8323 | | |
| 25* | −16.7083 | 6.7022 | 1.4910 | 57.58 |
| 26* | −326.7186 | 78.1271 | | |
| 27* | 103.4501 | −573.0000 | (Reflection Surface) | |

*Aspherical

TABLE 4B

Example 4
Aspherical Surface Coefficier

| | Surface No. | | | | | | |
|---|---|---|---|---|---|---|---|
| Symbol | 5* | 6* | 23* | 24* | 25* | 26* | 27* |
| K | −1.25146E+04 | 5.42225E+01 | 2.68296E−01 | 1.50107E−01 | −2.98459E+00 | −2.11564E+19 | 7.28738E−01 |
| A3 | 1.57500E−04 | 1.33981E−05 | −1.23356E−04 | −1.98635E−04 | −7.84881E−04 | −6.15017E−04 | −2.79075E−05 |
| A4 | −2.72972E−06 | 1.48431E−05 | 1.46532E−05 | 6.73802E−05 | −1.22326E−05 | −2.59019E−05 | −8.83800E−08 |
| A5 | 2.43007E−07 | 3.91515E−07 | 1.93289E−06 | −7.62731E−07 | 5.08375E−07 | 1.75194E−06 | 5.89582E−08 |
| A6 | 1.76324E−08 | 7.08162E−09 | −1.27629E−08 | −6.56215E−09 | 1.11203E−08 | −2.18107E−08 | −2.39716E−09 |
| A7 | −4.19159E−10 | −3.37182E−10 | −2.37989E−09 | 8.70989E−10 | 1.37073E−10 | −4.51687E−10 | 1.80556E−11 |
| A8 | −5.65819E−11 | −3.45886E−11 | −5.04841E−11 | 1.65041E−11 | 2.02383E−12 | 5.39371E−13 | 7.77753E−13 |
| A9 | −2.28301E−12 | −2.11274E−12 | 4.20205E−12 | −1.08637E−13 | 6.45811E−14 | 2.34711E−13 | −1.83674E−14 |
| A10 | −3.61938E−14 | −1.85350E−13 | 2.15067E−13 | −1.62143E−14 | 1.43029E−15 | 5.67884E−15 | 1.03049E−16 |
| A11 | 1.87597E−15 | −3.67777E−15 | 1.88775E−15 | −1.20999E−16 | 6.18624E−17 | 2.27233E−17 | 1.84118E−19 |
| A12 | 7.83954E−17 | 3.23440E−16 | −7.13399E−16 | 2.82086E−17 | −2.11004E−19 | −1.72776E−18 | 1.38256E−20 |
| A13 | 6.59213E−18 | 8.67859E−18 | 4.49096E−18 | −5.12574E−19 | −4.41489E−20 | −8.91949E−20 | −2.34461E−22 |
| A14 | 2.53559E−19 | 4.24231E−19 | 2.21599E−19 | −9.84277E−21 | −2.94747E−21 | −2.23932E−21 | −5.22642E−25 |
| A15 | −2.96218E−21 | −5.95982E−21 | 2.98857E−21 | 1.32805E−22 | −1.01203E−22 | −2.74009E−23 | 4.18946E−27 |
| A16 | −1.01016E−21 | −3.94874E−21 | −4.99777E−23 | 9.99786E−24 | −3.51684E−24 | 5.79336E−25 | 4.01774E−28 |
| A17 | | | 3.76775E−23 | 9.72903E−25 | −8.82866E−26 | 4.76265E−26 | −3.05009E−30 |
| A18 | | | −1.04328E−24 | 2.92946E−26 | −1.22019E−27 | 1.46634E−27 | −2.49745E−32 |
| A19 | | | 1.85163E−26 | −1.85087E−28 | 3.67208E−29 | 1.82551E−29 | 3.50848E−34 |
| A20 | | | 4.85241E−27 | −5.31386E−29 | 5.56830E−30 | −1.27619E−30 | −1.06811E−36 |

FIGS. 5B, 5C illustrate distortion and spot diagrams of the projection optical system of Example 4 respectively.

As is clear from FIGS. 5A, 5B, 5C and Tables 4A, 4B, the projection optical system of Example 4 is a compact with a short overall length and high performance optical system capable of favorably correcting chromatic aberration and distortion.

Example 5

FIG. 6A is a cross-sectional view of a projection optical system of Example 5, illustrating the cross-section thereof.

The projection optical system of Example 5 also substantially consists of a first optical system K1 composed of four lens groups and a second optical system K2 which is an aspherical reflection mirror arranged in this order from the reduction side.

As illustrated in FIG. 6A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by two lenses indicated by symbols L8, L9, and a fourth lens group G4 constituted by four lenses indicated by symbols L10, L11, L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S27 of the second optical system K2 corresponds to the surface number 27 (refer to Table 5A).

The projection optical system of Example 5 is formed such that all optical surfaces constituting the first optical system K1 and the second optical system K2 have rotationally symmetric shapes around a common axis (optical axis Z1).

As is known from Table 10, the projection optical system of Example 5 satisfies both the conditional expressions (1) and (2).

Tables 5A, 5B that respectively indicate lens data and aspherical surface coefficients of the projection optical system of Example 5 are given below.

The lens data are, as can be seen from the data value described therein, those under the state in which the distance from the reflection mirror surface to the projection surface (conjugate plane on the magnification side, screen) is set to 573 mm and focused.

TABLE 5A

Example 5
Lens Data

| Surface No. | R | D | Nd | νd |
|---|---|---|---|---|
| 1 | ∞ | 32.0000 | 1.5163 | 64.14 |
| 2 | ∞ | 13.5595 | | |
| 3 | 52.6579 | 3.5810 | 1.4910 | 57.58 |
| 4 | 152.6449 | 0.3991 | | |
| 5* | 44.4852 | 9.8412 | 1.8052 | 25.42 |
| 6* | −83.4159 | 9.1149 | | |
| 7 | 66.5065 | 1.4490 | 1.6990 | 30.13 |
| 8 | 15.7948 | 13.0336 | 1.4970 | 81.54 |
| 9 | −31.2978 | 0.1991 | | |
| 10 | −36.8845 | 6.7959 | 1.6516 | 58.55 |
| 11 | −16.8569 | 1.2090 | 1.8052 | 25.42 |
| 12 | 248.3517 | 2.0700 | | |
| 13 (Aperture) | ∞ | 2.51578 | | |
| 14 | 41.8352 | 5.3561 | 1.6935 | 53.21 |
| 15 | −33.1071 | 0.516886 | | |
| 16 | 28.9497 | 7.1785 | 1.5814 | 40.75 |
| 17 | −21.3754 | 1.1990 | 1.8040 | 46.57 |
| 18 | 19.6341 | 11.1921 | | |
| 19 | −15.4877 | 1.6871 | 1.4875 | 70.23 |
| 20 | −671.8167 | 2.9162 | | |
| 21 | −56.1709 | 9.7093 | 1.8052 | 25.42 |
| 22 | −22.8972 | 15.3018 | | |
| 23* | −14.2645 | 6.0911 | 1.4910 | 57.58 |
| 24* | −11.6140 | 13.5425 | | |
| 25* | −18.6795 | 5.9991 | 1.4910 | 57.58 |
| 26* | −342.4126 | 70.1713 | | |
| 27* | 100.2827 | −573.0000 | (Reflection Surface) | |

*Aspherical

TABLE 5B

Example 5
Aspherical Surface Coefficient

| Symbol | 5* | 6* | 23* | 24* | 25* | 26* | 27* |
|---|---|---|---|---|---|---|---|
| K | −9.56808E+00 | 4.76282E+01 | 2.66919E−01 | 1.43874E−01 | −3.94057E+00 | −2.11564E+19 | 7.46827E−01 |
| A3 | 3.90948E−05 | 7.06165E−06 | −1.53333E−04 | −2.90437E−04 | −9.63204E−04 | −7.26660E−04 | −2.38685E−05 |
| A4 | 1.25005E−06 | 6.14432E−06 | 1.25241E−05 | 5.81555E−05 | −1.84799E−05 | −2.68005E−05 | −1.58240E−07 |
| A5 | 6.20555E−08 | 8.62020E−08 | 1.44796E−06 | −8.60650E−07 | 3.81619E−07 | 1.69085E−06 | 5.85827E−08 |
| A6 | 1.69303E−08 | 4.39300E−09 | −1.59695E−08 | −8.15486E−09 | 9.58265E−09 | −2.15638E−08 | −2.39438E−09 |
| A7 | 9.42760E−11 | 3.82268E−10 | −2.03102E−09 | 9.79408E−10 | 1.47866E−10 | −4.59506E−10 | 1.80843E−11 |
| A8 | −1.35851E−11 | 2.50732E−11 | −3.62392E−11 | 1.87929E−11 | 3.69046E−12 | 1.20724E−12 | 7.77866E−13 |
| A9 | −2.11578E−13 | 7.94808E−13 | 4.36474E−12 | −6.82753E−14 | 1.25216E−13 | 2.39249E−13 | −1.83677E−14 |
| A10 | 1.57525E−14 | −9.60959E−14 | 2.00642E−13 | −1.41864E−14 | 3.55253E−15 | 6.17326E−15 | 1.03032E−16 |
| A11 | 1.58103E−15 | −3.33408E−15 | 1.00380E−15 | −1.75609E−16 | 1.06704E−16 | 2.43755E−17 | 1.83965E−19 |
| A12 | −6.44119E−17 | 1.47626E−16 | −7.27707E−16 | 2.38843E−17 | 8.14116E−19 | −1.55639E−18 | 1.38245E−20 |
| A13 | −3.26717E−18 | −4.17513E−18 | 3.60076E−18 | −7.50980E−19 | −4.48315E−20 | −7.75650E−20 | −2.34466E−22 |
| A14 | −1.45701E−19 | −4.75590E−20 | 2.68523E−19 | −2.16079E−20 | −3.57080E−21 | −2.41892E−21 | −5.22623E−25 |
| A15 | −5.11427E−21 | 6.94274E−21 | 4.97273E−21 | −2.06221E−22 | −1.48480E−22 | −3.66469E−23 | 4.19015E−27 |
| A16 | 4.96215E−22 | −1.92333E−22 | 1.24159E−23 | −3.51584E−24 | −5.33388E−24 | 2.50164E−25 | 4.01783E−28 |
| A17 | | | 3.96067E−23 | 6.69076E−25 | −1.32826E−25 | 3.91468E−26 | −3.05000E−30 |
| A18 | | | −1.58537E−24 | 2.94471E−26 | −2.94367E−27 | 1.28850E−27 | −2.49743E−32 |
| A19 | | | −3.15539E−26 | −3.14140E−29 | 2.48690E−29 | 2.14227E−29 | 3.50844E−34 |
| A20 | | | 1.41141E−27 | −3.65346E−29 | 6.41362E−30 | −1.05354E−30 | −1.06822E−36 |

FIGS. 6B, 6C illustrate distortion and spot diagrams of the projection optical system of Example 5 respectively.

As is clear from FIGS. 6A, 6B, 6C and Tables 5A, 5B, the projection optical system of Example 5 is a compact with a short overall length and high performance optical system capable of favorably correcting chromatic aberration and distortion.

Example 6

FIG. 7A is a cross-sectional view of a projection optical system of Example 6, illustrating the cross-section thereof.

The projection optical system of Example 6 also substantially consists of a first optical system K1 composed of four lens groups and a second optical system K2 which is an aspherical reflection mirror arranged in this order from the reduction side.

As illustrated in FIG. 7A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by five lenses indicated by symbols L1, L2, l3, L4, L5 in the drawing, a second lens group G2 constituted by one lens indicated by a symbol L6, a third lens group G3 constituted by two lenses indicated by symbols L7, L8, and a fourth lens group G4 constituted by four lenses indicated by symbols L9, L10, L11, L12 arranged in this order from the reduction side. The reduction side lens surface S3 of the lens L1 indicated by the symbol L1 corresponds to the surface number 3 and the reflection surface S24 of the second optical system K2 corresponds to the surface number 24 (refer to Table 6A).

The projection optical system of Example 6 is formed such that all optical surfaces constituting the first optical system K1 and the second optical system K2 have rotationally symmetric shapes around a common axis (optical axis Z1).

As is known from Table 10, the projection optical system of Example 6 satisfies both the conditional expressions (1) and (2).

Tables 6A, 6B that respectively indicate lens data and aspherical surface coefficients of the projection optical system of Example 6 are given below.

The lens data are, as can be seen from the data value described therein, those under the state in which the distance from the reflection mirror surface to the projection surface (conjugate plane on the magnification side, screen) is set to 573 mm and focused.

TABLE 6A

Example 6
Lens Data

| Surface No. | R | D | Nd | νd |
|---|---|---|---|---|
| 1 | ∞ | 32.0000 | 1.5163 | 64.14 |
| 2 | ∞ | 13.5608 | | |
| 3* | 38.4967 | 4.5690 | 1.4910 | 57.58 |
| 4* | 158.6400 | 0.9241 | | |
| 5 | 56.3931 | 8.5532 | 1.8467 | 23.78 |
| 6 | −92.7543 | 11.6533 | | |
| 7 | 116.3774 | 1.4491 | 1.6990 | 30.13 |
| 8 | 14.5867 | 20.0193 | 1.4970 | 81.54 |
| 9 | −19.8118 | 3.0009 | 1.8467 | 23.78 |
| 10 | −60.8004 | 1.50 | | |
| 11 | 57.9425 | 5.5041 | 1.6516 | 58.55 |
| 12 | −31.1542 | 3.86 | | |
| 13 | 49.9186 | 8.6529 | 1.5174 | 52.43 |
| 14 | −18.9797 | 1.1991 | 1.7292 | 54.68 |
| 15 | 23.1321 | 11.00 | | |
| 16 | −16.2427 | 1.5490 | 1.5163 | 64.14 |
| 17 | −155.0553 | 2.8971 | | |
| 18 | −48.9817 | 10.3669 | 1.8467 | 23.78 |
| 19 | −23.3418 | 13.8790 | | |
| 20* | −15.9596 | 5.9991 | 1.4910 | 57.58 |
| 21* | −12.3006 | 13.0980 | | |
| 22* | −18.3249 | 6.0010 | 1.4910 | 57.58 |
| 23* | −341.9830 | 65.3437 | | |
| 24* | 98.7574 | −573.0000 | (Reflection Surface) | |

*Aspherical

TABLE 6B

Example 6
Aspherical Surface Coeff.

| Symbol | 3* | 4* | 20* | 21* | 22* | 23* | 24* |
|---|---|---|---|---|---|---|---|
| K | −2.62839E+00 | 5.07723E+01 | 2.80253E−01 | 1.42364E−01 | −3.50292E+00 | −2.11604E+19 | 7.40790E−01 |
| A3 | 1.77611E−05 | −8.99366E−06 | −9.48437E−05 | −2.72545E−04 | −9.88956E−04 | −7.45320E−04 | −2.33569E−05 |
| A4 | 1.78884E−06 | 7.98760E−06 | 1.69929E−06 | 5.48450E−05 | −1.84504E−05 | −2.68580E−05 | −1.88736E−07 |
| A5 | 7.40868E−08 | 1.13829E−08 | 1.46859E−06 | −9.75906E−07 | 3.51414E−07 | 1.72187E−06 | 5.86642E−08 |
| A6 | 1.21841E−08 | −5.72237E−10 | −1.45890E−08 | −9.72690E−09 | 8.70143E−09 | −2.29617E−08 | −2.39278E−09 |
| A7 | −1.18847E−10 | 1.25040E−10 | −2.11261E−09 | 9.73849E−10 | 1.44785E−10 | −4.58313E−10 | 1.80773E−11 |
| A8 | −2.05767E−11 | 1.38754E−11 | −4.03669E−11 | 1.99617E−11 | 4.41458E−12 | 8.68166E−13 | 7.77816E−13 |
| A9 | −2.77853E−13 | 5.63368E−13 | 4.22134E−12 | −2.77845E−15 | 1.49656E−13 | 2.48711E−13 | −1.83678E−14 |
| A10 | 2.17709E−14 | −8.94520E−14 | 1.98080E−13 | −1.26211E−14 | 4.57177E−15 | 6.35878E−15 | 1.03031E−16 |
| A11 | 2.22542E−15 | −2.21825E−15 | 1.09225E−15 | −1.31012E−16 | 1.29454E−16 | 2.36782E−17 | 1.83970E−19 |
| A12 | −2.26347E−17 | 2.09197E−16 | −7.40909E−16 | 2.60641E−17 | 1.61652E−18 | −1.69279E−18 | 1.38246E−20 |
| A13 | −1.40675E−18 | −1.74140E−18 | 3.32354E−18 | −7.88331E−19 | −3.36853E−20 | −8.39253E−20 | −2.34465E−22 |
| A14 | −8.00125E−20 | 4.61192E−21 | 2.77477E−19 | −2.31007E−20 | −3.12858E−21 | −2.53971E−21 | −5.22617E−25 |
| A15 | −5.76402E−21 | 4.57192E−21 | 4.14825E−21 | −1.21831E−22 | −1.49102E−22 | −3.66456E−23 | 4.19016E−27 |
| A16 | 1.99536E−22 | −4.89730E−22 | −1.48750E−23 | −9.06151E−24 | −5.33971E−24 | 2.30476E−25 | 4.01783E−28 |
| A17 | | | 4.19762E−23 | 6.51832E−25 | −1.21704E−25 | 4.11513E−26 | −3.05001E−30 |
| A18 | | | −1.60418E−24 | 2.43227E−26 | −3.46836E−27 | 1.27225E−27 | −2.49743E−32 |

TABLE 6B-continued

Example 6
Aspherical Surface Coeff.

| | | | Surface No. | | | | |
|---|---|---|---|---|---|---|---|
| Symbol | 3* | 4* | 20* | 21* | 22* | 23* | 24* |
| A19 | | | −3.25077E−26 | 1.28714E−28 | 1.01540E−29 | 1.92009E−29 | 3.50843E−34 |
| A20 | | | 1.34518E−27 | −2.66733E−29 | 4.74815E−30 | −1.17069E−30 | −1.06822E−36 |

FIGS. 7B, 7C illustrate distortion and spot diagrams of the projection optical system of Example 6 respectively.

As is clear from FIGS. 7A, 7B, 7C and Tables 6A, 6B, the projection optical system of Example 6 is a compact with a short overall length and high performance optical system capable of favorably correcting chromatic aberration and distortion.

Example 7

FIG. 8A is a cross-sectional view of a projection optical system of Example 7, illustrating the cross-section thereof.

The projection optical system of Example 7 also substantially consists of a first optical system K1 composed of four lens groups and a second optical system K2 which is an aspherical reflection mirror arranged in this order from the reduction side.

As illustrated in FIG. 8A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by five lenses indicated by symbols L1, L2, l3, L4, L5 in the drawing, a second lens group G2 constituted by one lens indicated by a symbol L6, a third lens group G3 constituted by two lenses indicated by symbols L7, L8, and a fourth lens group G4 constituted by four lenses indicated by symbols L9, L10, L11, L12 arranged in this order from the reduction side. Note that the lenses L3, L4, L5 of the first lens group G1 are cemented to form a cemented lens. The reduction side lens surface S3 of the lens L1 indicated by the symbol L1 corresponds to the surface number 3 and the reflection surface S24 of the second optical system K2 corresponds to the surface number 24 (refer to Table 7A).

The projection optical system of Example 7 is formed such that all optical surfaces constituting the first optical system K1 and the second optical system K2 have rotationally symmetric shapes around a common axis (optical axis Z1).

As is known from Table 10, the projection optical system of Example 7 satisfies both the conditional expressions (1) and (2).

Tables 7A, 7B that respectively indicate lens data and aspherical surface coefficients of the projection optical system of Example 7 are given below.

The lens data are, as can be seen from the data value described therein, those under the state in which the distance from the reflection mirror surface to the projection surface (conjugate plane on the magnification side, screen) is set to 573 mm and focused.

TABLE 7A

Example 7
Lens Data

| Surface No. | R | D | Nd | vd |
|---|---|---|---|---|
| 1 | ∞ | 32.0000 | 1.5163 | 64.14 |
| 2 | ∞ | 13.5599 | | |
| 3 | 40.7742 | 8.6108 | 1.8467 | 23.78 |
| 4 | −277.0101 | 0.4003 | | |
| 5* | 28.3787 | 9.0977 | 1.4910 | 57.58 |
| 6* | −539.2913 | 5.3516 | | |
| 7 | −92.5178 | 1.4491 | 1.6990 | 30.13 |
| 8 | 13.1029 | 20.0209 | 1.4970 | 81.54 |
| 9 | −15.0323 | 3.0010 | 1.7552 | 27.51 |
| 10 | −43.7605 | 2.31 | | |
| 11 | 80.6508 | 5.6893 | 1.6779 | 55.34 |
| 12 | −27.6990 | 1.32 | | |
| 13 | 40.5991 | 9.4136 | 1.5174 | 52.43 |
| 14 | −18.8096 | 1.1991 | 1.7292 | 54.68 |
| 15 | 23.0212 | 11.07 | | |
| 16 | −18.0561 | 1.5491 | 1.5638 | 60.67 |
| 17 | −225.0269 | 2.5208 | | |
| 18 | −54.4607 | 10.0605 | 1.8467 | 23.78 |
| 19 | −23.8224 | 14.2462 | | |
| 20* | −13.7430 | 6.2062 | 1.4910 | 57.58 |
| 21* | −11.4787 | 13.7577 | | |
| 22* | −18.4986 | 5.9990 | 1.4910 | 57.58 |
| 23* | −330.6966 | 67.7378 | | |
| 24* | 101.6137 | −573.0000 | (Reflection Surface) | |

*Aspherical

TABLE 7B

Example 7
Aspherical Surface Coeff.

| | | | Surface No. | | | | |
|---|---|---|---|---|---|---|---|
| Symbol | 5* | 6* | 20* | 21* | 22* | 23* | 24* |
| K | −7.79413E−01 | −5.18320E+03 | 2.76751E−01 | 1.42896E−01 | −3.75815E+00 | −2.11606E+19 | 7.35448E−01 |
| A3 | 2.31397E−05 | −1.46476E−05 | −5.94790E−05 | −2.30798E−04 | −9.83063E−04 | −7.74939E−04 | −2.21180E−05 |
| A4 | 2.27349E−06 | 9.89808E−06 | 9.17500E−06 | 5.65733E−05 | −2.09098E−05 | −2.57962E−05 | −1.81546E−07 |
| A5 | 2.66966E−07 | −7.99591E−08 | 1.46278E−06 | −1.00689E−06 | 2.99980E−07 | 1.68000E−06 | 5.87594E−08 |
| A6 | 1.55985E−09 | −2.75954E−09 | −1.75872E−08 | −9.20252E−09 | 8.38673E−09 | −2.25859E−08 | −2.39240E−09 |

TABLE 7B-continued

Example 7
Aspherical Surface Coeff.

| | Surface No. | | | | | | |
|---|---|---|---|---|---|---|---|
| Symbol | 5* | 6* | 20* | 21* | 22* | 23* | 24* |
| A7 | −5.46519E−10 | −2.18569E−10 | −1.96068E−09 | 9.94458E−10 | 1.64644E−10 | −4.74089E−10 | 1.80719E−11 |
| A8 | −1.64336E−11 | −4.95932E−12 | −3.01968E−11 | 1.99825E−11 | 5.25237E−12 | 1.63767E−12 | 7.77762E−13 |
| A9 | 4.13038E−13 | −3.10845E−13 | 4.58766E−12 | −5.15630E−15 | 1.72678E−13 | 2.59523E−13 | −1.83676E−14 |
| A10 | 2.91155E−14 | −1.33305E−13 | 2.05953E−13 | −1.25381E−14 | 5.14792E−15 | 6.54583E−15 | 1.03032E−16 |
| A11 | 5.34137E−16 | −4.25229E−15 | 1.19731E−15 | −1.11446E−16 | 1.40476E−16 | 2.56032E−17 | 1.84024E−19 |
| A12 | −1.64473E−16 | −1.16300E−17 | −7.44207E−16 | 2.75303E−17 | 1.74628E−18 | −1.70713E−18 | 1.38250E−20 |
| A13 | −6.19201E−18 | −1.57642E−17 | 3.22841E−18 | −7.26796E−19 | −3.52188E−20 | −8.45853E−20 | −2.34462E−22 |
| A14 | −1.14442E−19 | −6.26731E−19 | 2.74021E−19 | −2.02766E−20 | −3.45601E−21 | −2.58075E−21 | −5.22612E−25 |
| A15 | −6.52551E−21 | 2.38661E−21 | 4.44416E−21 | −6.45205E−23 | −1.62113E−22 | −3.70298E−23 | 4.19003E−27 |
| A16 | −1.80175E−21 | 3.59684E−21 | 2.85901E−24 | −5.99576E−24 | −5.82212E−24 | 2.32836E−25 | 4.01781E−28 |
| A17 | | | 4.33966E−23 | 7.33482E−25 | −1.33462E−25 | 4.21565E−26 | −3.05003E−30 |
| A18 | | | −1.54781E−24 | 2.49076E−26 | −3.71857E−27 | 1.32232E−27 | −2.49745E−32 |
| A19 | | | −3.04687E−26 | 6.08107E−29 | 1.67066E−29 | 2.13272E−29 | 3.50846E−34 |
| A20 | | | 1.39342E−27 | −3.45919E−29 | 5.43529E−30 | −1.07394E−30 | −1.06818E−36 |

FIGS. 7B, 7C illustrate distortion and spot diagrams of the projection optical system of Example 7 respectively.

As is clear from FIGS. 8A, 8B, 8C and Tables 7A, 7B, the projection optical system of Example 7 is a compact with a short overall length and high performance optical system capable of favorably correcting chromatic aberration and distortion.

Example 8

FIG. 9A is a cross-sectional view of a projection optical system of Example 8, illustrating the cross-section thereof.

The projection optical system of Example 8 also substantially consists of a first optical system K1 composed of four lens groups and a second optical system K2 which is an aspherical reflection mirror arranged in this order from the reduction side.

As illustrated in FIG. 9A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by six lenses indicated by symbols L1, L2, l3, L4, L5, L6 in the drawing, a second lens group G2 constituted by one lens indicated by a symbol L7, a third lens group G3 constituted by four lenses indicated by symbols L8, L9, L10, L11, and a fourth lens group G4 constituted by two lenses indicated by symbols L12, L13 arranged in this order from the reduction side. Note that an aperture stop St is associated with the first lens group G1. The reduction side lens surface S3 of the lens L1 indicated by the symbol L1 corresponds to the surface number 3 and the reflection surface S26 of the second optical system K2 corresponds to the surface number 26 (refer to Table 8A).

The projection optical system of Example 8 is formed such that all optical surfaces constituting the first optical system K1 and the second optical system K2 have rotationally symmetric shapes around a common axis (optical axis Z1).

As is known from Table 10, the projection optical system of Example 8 satisfies both the conditional expressions (1) and (2).

Tables 8A, 8B that respectively indicate lens data and aspherical surface coefficients of the projection optical system of Example 8 are given below.

The lens data are, as can be seen from the data value described therein, those under the state in which the distance from the reflection mirror surface to the projection surface (conjugate plane on the magnification side, screen) is set to 532 mm and focused.

TABLE 8A

Example 8
Lens Data

| Surface No. | R | D | Nd | vd |
|---|---|---|---|---|
| 1 | ∞ | 32.0000 | 1.5163 | 64.14 |
| 2 | ∞ | 13.5516 | | |
| 3 | 37.5654 | 9.6529 | 1.8052 | 25.42 |
| 4 | −140.9009 | 0.2997 | | |
| 5* | 94.0477 | 3.4990 | 1.4910 | 57.58 |
| 6* | 157.2247 | 0.2991 | | |
| 7 | 48.2456 | 1.4990 | 1.6668 | 33.05 |
| 8 | 17.7227 | 13.6953 | 1.4970 | 81.54 |
| 9 | −42.6431 | 0.1991 | | |
| 10 | −173.3843 | 7.9532 | 1.6516 | 58.55 |
| 11 | −17.1330 | 1.2491 | 1.7552 | 27.51 |
| 12 | 46.4624 | 7.1800 | | |
| 13 (Aperture) | ∞ | 6.6403 | | |
| 14 | 50.2323 | 6.2340 | 1.6516 | 58.55 |
| 15 | −35.7367 | 2.8392 | | |
| 16 | 45.8301 | 8.7606 | 1.5174 | 52.43 |
| 17 | −20.1168 | 1.3991 | 1.6935 | 50.81 |
| 18 | 25.7270 | 8.9218 | | |
| 19 | −17.5715 | 1.6090 | 1.5638 | 60.67 |
| 20 | −120.3698 | 7.8529 | 1.8052 | 25.42 |
| 21 | −25.6878 | 13.9487 | | |
| 22* | −12.5629 | 7.9994 | 1.4910 | 57.58 |
| 23* | −11.7019 | 15.6597 | | |
| 24* | −18.3154 | 5.9991 | 1.4910 | 57.58 |
| 25* | −281.7641 | 60.7054 | | |
| 26* | 110.6320 | −532.0000 | (Reflection Surface) | |

*Aspherical

TABLE 8B

Example 8
Aspherical Surface Coeff.

| Symbol | 5* | 6* | 22* | 23* | 24* | 25* | 26* |
|---|---|---|---|---|---|---|---|
| K | −5.93784E+01 | 6.42290E+01 | 2.36651E−01 | 1.82771E−01 | −2.88635E+00 | −2.11564E+19 | 8.10964E−01 |
| A3 | −2.22508E−06 | −1.36196E−05 | −1.57248E−04 | −2.59491E−04 | −9.31912E−04 | −8.27410E−04 | −1.91571E−05 |
| A4 | 1.74870E−06 | 5.71872E−06 | 3.20068E−05 | 5.97679E−05 | −2.18141E−05 | −1.84343E−05 | −2.12253E−07 |
| A5 | −6.01991E−10 | 3.05717E−07 | 1.87526E−06 | −5.78478E−07 | 2.41939E−07 | 1.32476E−06 | 5.90314E−08 |
| A6 | −2.52906E−09 | −3.50369E−09 | −5.32173E−08 | 6.85354E−10 | 3.76617E−09 | −1.63321E−08 | −2.39126E−09 |
| A7 | −3.78066E−10 | −4.04763E−10 | −2.37259E−09 | 1.03168E−09 | −3.79921E−11 | −4.43158E−10 | 1.80928E−11 |
| A8 | −2.37970E−11 | −3.09209E−11 | 4.18043E−11 | 1.67370E−11 | −7.67634E−13 | −9.36738E−13 | 7.77677E−13 |
| A9 | −1.11444E−12 | −1.28664E−12 | 6.78067E−12 | −2.33491E−13 | 8.65412E−14 | 1.95601E−13 | −1.83695E−14 |
| A10 | −1.91942E−14 | −7.24375E−14 | 2.07871E−13 | −2.26097E−14 | 5.61794E−15 | 6.34753E−15 | 1.03021E−16 |
| A11 | 8.32393E−16 | −1.65024E−15 | −3.16955E−15 | −3.89743E−16 | 2.90174E−16 | 7.31842E−17 | 1.84014E−19 |
| A12 | 1.04058E−16 | 1.29577E−16 | −1.02858E−15 | 1.84334E−17 | 1.06625E−17 | −9.77887E−21 | 1.38262E−20 |
| A13 | | | −8.14525E−18 | −7.84520E−19 | 3.80007E−19 | −6.13164E−20 | −2.34445E−22 |
| A14 | | | −9.38617E−21 | −1.71792E−20 | 1.23794E−20 | −2.29286E−21 | −5.22507E−25 |
| A15 | | | 1.20147E−20 | −6.35368E−23 | 3.54750E−22 | −5.55040E−23 | 4.19083E−27 |
| A16 | | | 1.08441E−21 | 1.23249E−23 | 8.52364E−24 | −6.72635E−25 | 4.01776E−28 |
| A17 | | | 1.01320E−22 | 1.25447E−24 | 8.65942E−26 | 1.19005E−26 | −3.05019E−30 |
| A18 | | | 9.20911E−25 | 4.15341E−26 | −6.83541E−27 | 9.05228E−28 | −2.49765E−32 |
| A19 | | | −2.25974E−26 | 1.00576E−27 | −6.67089E−28 | 2.63818E−29 | 3.50836E−34 |
| A20 | | | −8.41955E−27 | −4.98190E−30 | −4.07045E−29 | 4.07650E−32 | −1.06791E−36 |

Figure 9B:
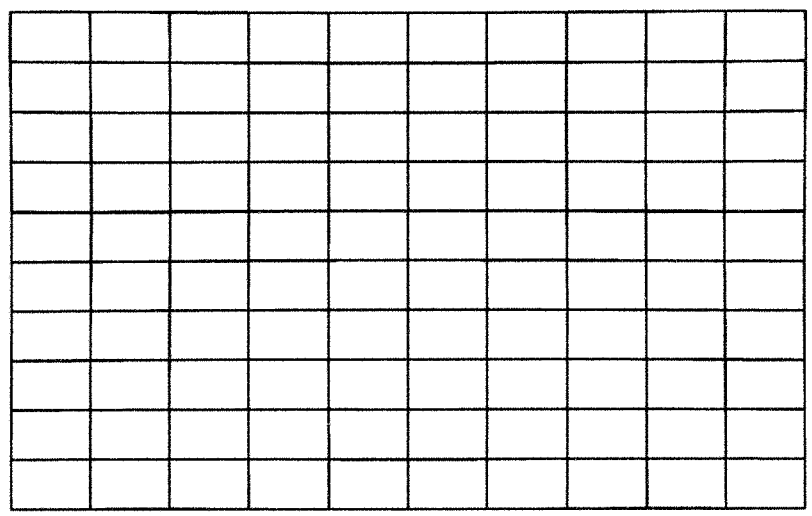
FIG. 9B illustrates distortion of the projection optical system of Example 8.
Figure 9C:
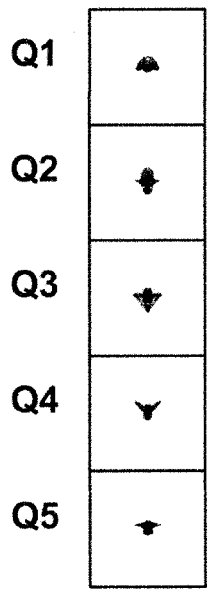
FIG. 9C illustrates spot diagrams of the projection optical system of Example 8.

FIGS. 9B, 9C illustrate distortion and spot diagrams of the projection optical system of Example 8 respectively.

As is clear from FIGS. 9A, 9B, 9C and Tables 8A, 8B, the projection optical system of Example 8 is a compact with a short overall length and high performance optical system capable of favorably correcting chromatic aberration and distortion.

Example 9

FIG. 10A is a cross-sectional view of a projection optical system of Example 9, illustrating the cross-section thereof.

The projection optical system of Example 9 also substantially consists of a first optical system K1 composed of four lens groups and a second optical system K2 which is an aspherical reflection mirror arranged in this order from the reduction side.

As illustrated in FIG. 10A, the first optical system K1 has four lens groups (first lens group G1 to fourth lens group G4) which are moved in an axis Z1 direction while the distance between each of them is changed to perform focus adjustment when the projection distance is changed.

The first optical system K1 is composed of a first lens group G1 constituted by seven lenses indicated by symbols L1, L2, l3, L4, L5, L6, L7 in the drawing, a second lens group G2 constituted by one lens indicated by a symbol L8, a third lens group G3 constituted by four lenses indicated by symbols L9, L10, L11, L12, and a fourth lens group G4 constituted by three lenses indicated by symbols L13, L14, L15 arranged in this order from the reduction side. Note that an aperture stop St is associated with the first lens group G1. Note that an aperture stop St is associated with the first lens group G1. The reduction side lens surface S3 of the lens L1 indicated by the symbol L1 corresponds to the surface number 3 and the reflection surface S31 of the second optical system K2 corresponds to the surface number 31 (refer to Table 9A).

The projection optical system of Example 9 is formed such that all optical surfaces constituting the first optical system K1 and the second optical system K2 have rotationally symmetric shapes around a common axis (optical axis Z1).

As is known from Table 10, the projection optical system of Example 9 satisfies both the conditional expressions (1) and (2).

Tables 9A, 9B that respectively indicate lens data and aspherical surface coefficients of the projection optical system of Example 9 are given below.

The lens data are, as can be seen from the data value described therein, those under the state in which the distance from the reflection mirror surface to the projection surface (conjugate plane on the magnification side, screen) is set to 573 mm and focused.

TABLE 9A

Example 9
Lens Data

| Surface No. | R | D | Nd | vd |
|---|---|---|---|---|
| 1 | 0.0000 | 32.0000 | 1.5163 | 64.14 |
| 2 | 0.0000 | 13.5000 | | |
| 3 | 41.8011 | 8.1546 | 1.8467 | 23.78 |
| 4 | −315.6304 | 0.1991 | | |
| 5* | 98.9532 | 3.4990 | 1.4910 | 57.58 |
| 6* | 165.6896 | 0.1991 | | |
| 7 | 49.4702 | 5.6216 | 1.5891 | 61.14 |
| 8 | 248.8886 | 0.1991 | | |
| 9 | 171.5341 | 1.4992 | 1.5317 | 48.84 |
| 10 | 14.4547 | 13.6544 | 1.4970 | 81.54 |
| 11 | −35.5196 | 0.2007 | | |
| 12 | −39.9945 | 4.9397 | 1.6204 | 60.29 |
| 13 | −16.8467 | 1.1991 | 1.8052 | 25.42 |
| 14 | 55.4297 | 6.8800 | | |
| 15 (Aperture) | 0.0000 | 0.5298 | | |
| 16 | 46.7123 | 5.0173 | 1.6204 | 60.29 |
| 17 | −40.7118 | 18.0841 | | |
| 18 | 38.4443 | 7.9447 | 1.6034 | 38.03 |
| 19 | −36.7916 | 1.6100 | 1.6031 | 60.64 |
| 20 | 37.9509 | 9.2824 | | |
| 21 | −16.7020 | 1.5990 | 1.5638 | 60.67 |
| 22 | 452.2060 | 3.1068 | | |
| 23 | −64.9384 | 9.5567 | 1.8052 | 25.42 |
| 24 | −24.6111 | 6.2052 | | |
| 25* | −26.8179 | 5.4991 | 1.4910 | 57.58 |
| 26* | −13.0403 | 1.9990 | | |
| 27 | −30.7858 | 2.1992 | 1.8467 | 23.78 |
| 28 | −39.0709 | 6.1758 | | |
| 29* | −15.3056 | 5.9993 | 1.4910 | 57.58 |
| 30* | −501.1831 | 64.9990 | | |
| 31* | 104.1000 | −573.0000 | (Reflection Surface) | |

*Aspherical

TABLE 9B

Example 9
Aspherical Surface Coeff.

| Symbol | Surface No. | | | | | | |
|---|---|---|---|---|---|---|---|
| | 5* | 6* | 25* | 26* | 29* | 30* | 31* |
| K | −7.72301E+01 | 7.30539E+01 | 1.46394E+00 | 2.25376E−01 | −2.21573E+00 | −2.40771E+34 | 7.91272E−01 |
| A3 | 9.28004E−05 | 7.64500E−05 | −7.00190E−05 | −2.09402E−04 | −3.32639E−04 | −2.36245E−04 | −1.39863E−05 |
| A4 | 1.31923E−05 | 1.34748E−05 | −4.04585E−05 | 5.10111E−05 | −1.11117E−05 | −3.26424E−05 | −1.56684E−07 |
| A5 | 3.03335E−07 | 5.15957E−07 | 1.78573E−06 | −1.19251E−06 | 5.24569E−07 | 1.42482E−06 | 1.30334E−09 |
| A6 | −1.89404E−09 | 2.01181E−09 | −5.40981E−09 | −1.27076E−08 | 9.54484E−09 | −1.56859E−08 | −3.36705E−11 |
| A7 | −4.46914E−10 | −4.45172E−10 | −2.53777E−09 | 9.33609E−10 | −4.37713E−12 | −2.56974E−10 | −4.06818E−13 |
| A8 | −2.02410E−11 | −2.38661E−11 | −2.83959E−11 | 3.30128E−11 | −3.53480E−12 | 1.35081E−13 | 3.11657E−15 |
| A9 | −4.86548E−13 | −4.40663E−13 | 4.37761E−12 | 8.10616E−13 | −8.40914E−14 | 8.44670E−14 | 1.27480E−16 |
| A10 | −4.31122E−15 | −3.84598E−14 | 2.36270E−13 | 2.30322E−14 | −1.31855E−15 | 1.64533E−15 | 2.95982E−19 |
| A11 | −5.47935E−16 | −3.42065E−15 | 1.96989E−15 | 1.13996E−15 | 1.24314E−18 | 3.62616E−18 | −3.05769E−20 |
| A12 | −1.27378E−16 | −3.05438E−16 | −6.75850E−16 | 6.02029E−17 | 9.69808E−20 | 3.32418E−19 | 1.66549E−22 |
| A13 | | | −3.56846E−19 | −2.46470E−19 | −2.21451E−20 | −8.84882E−22 | 5.59074E−26 |
| A14 | | | 1.19497E−19 | −3.54127E−20 | −4.03537E−22 | −2.37858E−22 | 5.06086E−28 |
| A15 | | | 8.74422E−21 | −2.08793E−21 | 1.00930E−24 | −1.13504E−23 | 3.12644E−30 |
| A16 | | | 7.22029E−22 | −9.92858E−23 | 5.84037E−25 | −3.13589E−25 | 2.24648E−33 |
| A17 | | | 4.51683E−23 | −3.55919E−24 | 3.26046E−26 | −7.34658E−27 | −2.58918E−34 |
| A18 | | | 2.00233E−25 | −9.29696E−26 | 1.15759E−27 | −7.12509E−29 | −4.11168E−36 |
| A19 | | | 2.04477E−26 | −1.89605E−28 | 1.50936E−29 | 2.57253E−30 | −3.05249E−38 |
| A20 | | | −3.48114E−27 | 2.41636E−28 | −1.78803E−30 | 2.50172E−31 | 1.23870E−40 |

FIGS. 10B, 10C illustrate distortion and spot diagrams of the projection optical system of Example 9 respectively.

As is clear from FIGS. 10A, 10B, 10C and Tables 9A, 9B, the projection optical system of Example 9 is a compact with a short overall length and high performance optical system capable of favorably correcting chromatic aberration and distortion.

TABLE 10

Formula Value in Each Conditional Expression

| | Formula in C/E (1): $Zf/T12$ | Formula in C/E (2): $D/Zr$ |
|---|---|---|
| Example 1 | 0.35 | 0.48 |
| Example 2 | 0.38 | 0.47 |
| Example 3 | 0.58 | 0.50 |
| Example 4 | 0.24 | 0.49 |
| Example 5 | 0.38 | 0.48 |
| Example 6 | 0.46 | 0.44 |
| Example 7 | 0.42 | 0.46 |
| Example 8 | 0.43 | 0.54 |
| Example 9 | 0.30 | 0.34 |
| U. Limit | 1.0 | 1.0 |
| L. Limit | 0.1 | 0.0 |

The present invention is not limited to each of the examples described above, and various alternative examples are possible without departing from the spirit of the present invention. For example, values of radius of curvature of each lens, surface distance, refractive index, and the like are not limited to those shown in each table and may take other values.

What is claimed is:

1. A projection optical system for magnifying and projecting an image formed on a conjugate plane on the reduction side to a conjugate plane on the magnification side, the projection optical system substantially consisting of a first optical system composed of a plurality of lenses and a second optical system composed of one reflection mirror having a convex aspherical surface arranged in this order from the reduction side, wherein the projection optical system satisfies a conditional expression (1) given below:

$$0.1 < Zf/T12 < 1.0 \tag{1}$$

where:

T12 is an air space between the first optical system and the second optical system; and Zf is a displacement in a direction of the optical axial from a position of maximum effective height on the magnification side lens surface of the lens disposed on the most magnification side in the first optical system to the vertex of the lens surface.

2. The projection optical system of claim 1, wherein the lens disposed on the most magnification side in the first optical system is an aspherical lens.

3. The projection optical system of claim 1, wherein projection optical system satisfies a conditional expression (2) given below:

$$0 < D/Zr < 1.0 \tag{2}$$

where:

D is an air space between the lens disposed on the most magnification side in the first optical system and a lens adjacent thereto in the first optical system; and Zr is a displacement in a direction of the optical axis from a position of maximum effective height on the reduction side lens surface of the lens disposed on the most magnification side in the first optical system to the vertex of the lens surface.

4. The projection optical system of claim 1, wherein two of the three lenses disposed on the most magnification side among the lenses constituting the first optical system are aspherical lenses.

5. The projection optical system of claim 1, wherein the reduction side of the entire lens system has telecentricity.

6. The projection optical system of claim 1, wherein all optical surfaces constituting the first and second optical systems are formed so as to have rotationally symmetric shapes around one common axis.

7. The projection optical system of claim 2, wherein projection optical system satisfies a conditional expression (2) given below:

$$0 < D/Zr < 1.0 \tag{2}$$

where:
- D is an air space between the lens disposed on the most magnification side in the first optical system and a lens adjacent thereto in the first optical system; and
- Zr is a displacement in a direction of the optical axis from a position of maximum effective height on the reduction side lens surface of the lens disposed on the most magnification side in the first optical system to the vertex of the lens surface.

8. The projection optical system of claim 2, wherein two of the three lenses disposed on the most magnification side among the lenses constituting the first optical system are aspherical lenses.

9. The projection optical system of claim 2, wherein the reduction side of the entire lens system has telecentricity.

10. The projection optical system of claim 2, wherein all optical surfaces constituting the first and second optical systems are formed so as to have rotationally symmetric shapes around one common axis.

11. The projection optical system of claim 3, wherein two of the three lenses disposed on the most magnification side among the lenses constituting the first optical system are aspherical lenses.

12. The projection optical system of claim 3, wherein the reduction side of the entire lens system has telecentricity.

13. The projection optical system of claim 3, wherein all optical surfaces constituting the first and second optical systems are formed so as to have rotationally symmetric shapes around one common axis.

14. The projection optical system of claim 4, wherein the reduction side of the entire lens system has telecentricity.

15. The projection optical system of claim 4, wherein all optical surfaces constituting the first and second optical systems are formed so as to have rotationally symmetric shapes around one common axis.

16. A projection display apparatus, comprising a light source, a light valve, an illumination optical unit for guiding a luminous flux from the light source to the light valve, and the projection optical system of claim 1, wherein the luminous flux from the light source is optically modulated by the light valve and the optically modulated luminous flux is projected onto a screen through the projection optical system.

* * * * *